United States Patent
Sato et al.

(10) Patent No.: US 8,816,874 B2
(45) Date of Patent: Aug. 26, 2014

(54) DANGER PRESENTATION DEVICE, DANGER PRESENTATION SYSTEM, DANGER PRESENTATION METHOD AND PROGRAM

(75) Inventors: Taichi Sato, Kyoto (JP); Kenji Mizutani, Kyoto (JP)

(73) Assignee: Panasonic Corporation, Osaka (JP)

( * ) Notice: Subject to any disclaimer, the term of this patent is extended or adjusted under 35 U.S.C. 154(b) by 133 days.

(21) Appl. No.: 13/430,853

(22) Filed: Mar. 27, 2012

(65) Prior Publication Data

US 2012/0182155 A1 Jul. 19, 2012

Related U.S. Application Data

(63) Continuation of application No. PCT/JP2011/000237, filed on Jan. 19, 2011.

(30) Foreign Application Priority Data

Jan. 25, 2010 (JP) ................................. 2010-013658

(51) Int. Cl.
G08B 21/00 (2006.01)

(52) U.S. Cl.
USPC .......... 340/686.6; 340/686.1; 901/1; 700/258

(58) Field of Classification Search
USPC .............. 340/686.6, 686.1, 679; 901/1, 9, 46; 382/153
See application file for complete search history.

(56) References Cited

U.S. PATENT DOCUMENTS

| | | | |
|---|---|---|---|
| 8,249,747 B2* | 8/2012 | Kock | 700/253 |
| 8,423,188 B2* | 4/2013 | Tsusaka et al. | 700/253 |
| 2003/0146827 A1 | 8/2003 | Koike | |
| 2005/0218292 A1 | 10/2005 | Kawabe et al. | |
| 2006/0049939 A1* | 3/2006 | Haberer et al. | 340/541 |
| 2006/0195226 A1 | 8/2006 | Matsukawa et al. | |
| 2008/0161970 A1* | 7/2008 | Adachi et al. | 700/253 |

(Continued)

FOREIGN PATENT DOCUMENTS

| | | |
|---|---|---|
| JP | 59-205298 | 11/1984 |
| JP | 07-290386 | 11/1995 |

(Continued)

OTHER PUBLICATIONS

International Search Report issued Apr. 19, 2011 in International (PCT) Application No. PCT/JP2011/000237.

(Continued)

*Primary Examiner* — Toan N Pham
(74) *Attorney, Agent, or Firm* — Wenderoth, Lind & Ponack, L.L.P.

(57) ABSTRACT

A danger presentation device includes a worker position acquisition unit configured to acquire a worker position which is a position of a worker; a worker view range determination unit configured to determine a view range of the worker depending on the worker position acquired by the worker position acquisition unit; a position/posture determination unit configured to determine a position/posture which contains at least one of a position of a robot and a posture of the robot at a specific time in which at least a part of the robot which operates in accordance with a motion planning is included in the view range; and an image generation unit configured to generate image data for illustrating the position/posture determined by the position/posture determination unit.

21 Claims, 30 Drawing Sheets

(56) References Cited

U.S. PATENT DOCUMENTS

| | | | |
|---|---|---|---|
| 2009/0171505 A1* | 7/2009 | Okazaki | 700/258 |
| 2010/0063627 A1 | 3/2010 | Kitahama | |
| 2010/0087955 A1* | 4/2010 | Tsusaka et al. | 700/245 |

FOREIGN PATENT DOCUMENTS

| | | |
|---|---|---|
| JP | 2001-001284 | 1/2001 |
| JP | 2004-171269 | 6/2004 |
| JP | 2004-243427 | 9/2004 |
| JP | 2005-066766 | 3/2005 |
| JP | 2005-288573 | 10/2005 |
| JP | 2007-102488 | 4/2007 |
| JP | 2007-316924 | 12/2007 |
| JP | 2008-018529 | 1/2008 |
| JP | 2008-117197 | 5/2008 |
| JP | 2008-307658 | 12/2008 |
| JP | 2009-026200 | 2/2009 |
| JP | 2009-113190 | 5/2009 |
| JP | 2009-123045 | 6/2009 |
| WO | 2005/015466 | 2/2005 |
| WO | 2009/063318 | 5/2009 |

OTHER PUBLICATIONS

Office Action and Search Report issued Apr. 18, 2014 in corresponding Chinese Application No. 201180005161.4 (with English translation).

* cited by examiner $V = V2 \ (|V2| > |V1|)$

DANGER PRESENTATION DEVICE, DANGER PRESENTATION SYSTEM, DANGER PRESENTATION METHOD AND PROGRAM

This is a continuation application of PCT application No. PCT/JP2011/000237 filed on Jan. 19, 2011, designating the United States of America.

The disclosure of Japanese Patent Application No. 2010-013658 filed on Jan. 25, 2010 including specification, drawings and claims is incorporated herein by reference in its entirety.

The disclosure of PCT application No. PCT/JP2011/000237 filed on Jan. 19, 2011, including specification, drawings and claims is incorporated herein by reference in its entirety.

BACKGROUND OF THE INVENTION (1) Field of the Invention

The present invention relates to a danger presentation device which generates data for presenting a possible danger caused by a robot which operates in accordance with a motion planning.

(2) Description of the Related Art

Conventionally, robots have been used in production sites and the like. When a robot is used, a worker may come into contact with the robot and get injured. Thus, a safety measure may be taken by surrounding the robot with a safety fence. However, it may be difficult for a worker do some work when a safety fence is installed between the robot and the worker. In this case, for example, it is difficult for the worker and the robot to carry a table by holding both ends of the table, respectively, in a cooperative manner. In the above case, it is also difficult for the robot to hand over a part, a tool, or the like to a worker who does assembly work.

In such a work situation, it is not practical to install a safety fence between a worker and a robot that works cooperatively with the worker, or a robot that works near the worker. Thus, when such a robot is used, a user of the robot needs to pay more attention to safety than is normally needed.

Japanese Unexamined Patent Application Publication No. 2009-123045 discloses a movable robot which visually displays a dangerous area around the movable robot. The dangerous area around the movable robot described in Japanese Unexamined Patent Application Publication No. 2009-123045 varies every moment depending on the direction and the speed of the movement of the robot. The movable robot then determines a dangerous area based on a motion planning such as the movement speed of the robot.

FIG. 38 is a diagram illustrating a dangerous area when the movable robot is stopped. A movable robot 9001 illustrated in FIG. 38 includes a front-side projector 9101, a rear-side projector 9102, a right-side projector 9103, and a left-side projector 9104. A dangerous area 9060 illustrated in FIG. 38 is the dangerous area when the movable robot 9001 is stopped. The dangerous area 9060 is projected to the four projectors 9101, 9102, 9103, and 9104, and is presented to a worker.

FIG. 39 is a diagram illustrating the dangerous area 9060 when the movable robot 9001 illustrated in FIG. 38 is in motion. The dangerous area 9060 illustrated in FIG. 39 is the dangerous area when the movable robot 9001 moves to the left side at a speed V1. The dangerous area 9060 has a left side area of the movable robot 9001 in the moving direction, which is larger than the left side area of the movable robot 9001 when stopped.

FIG. 40 is a diagram illustrating the dangerous area 9060 when the movable robot 9001 illustrated in FIG. 38 moves faster than the speed V1. The dangerous area 9060 becomes even greater than the dangerous area when moving at the speed V1.

FIG. 41 is a diagram illustrating the dangerous area 9060 when the movable robot 9001 illustrated in FIG. 38 operates a left arm 9012. The dangerous area 9060 has an expanded area near the left arm 9012.

However, even when a robot presents a dangerous area around itself, the dangerous area may not be appropriately recognized by a worker. For example, when a robot presents a dangerous area at a place which cannot be viewed by a worker, the dangerous area cannot be appropriately recognized by the worker. Thus the robot and the worker may collide with each other, thereby preventing smooth operation of the robot.

In addition, it is difficult for the worker to precisely recognize a dangerous situation with the dangerous area shown around the robot. For example, it is difficult for the worker to recognize a danger related situation such as in which direction movement would avoid the dangerous situation, in which direction movement would be more dangerous, which area is less dangerous, or how dangerous the current state is. Hereinafter, specific examples are described.

FIG. 42 is a diagram illustrating a problem in a conventional technology. A worker 9061 in the dangerous area 9060 cannot directly view either of a right arm 9011 and a left arm 9012 of the movable robot 9001 from the position of the worker 9061 illustrated in FIG. 42. Thus, even though the worker 9061 recognizes that he is in the dangerous area 9060, he cannot tell which one of the right arm 9011 and the left arm 9012 is moving toward him. Therefore, the worker 9061 cannot tell in which direction an arm of the movable robot 9001 is moving toward him, thus the worker 9061 cannot determine in which direction he should move to avoid the dangerous situation.

SUMMARY OF THE INVENTION

Now, it is an object of the present invention to provide a danger presentation device which generates data for appropriately presenting a dangerous situation accompanied by the motion of a robot.

In order to solve the aforementioned problem, a danger presentation device in the present invention includes a worker position acquisition unit configured to acquire a worker position which is a position of a worker; a worker view range determination unit configured to determine a view range of the worker depending on the worker position acquired by the worker position acquisition unit; a position/posture determination unit configured to identify a specific time in which at least a part of a robot which operates according to a motion planning is included in the view range, and to determine a position/posture which contains at least one of a position of the robot at the specific time and a posture of the robot at the specific time; and an image generation unit configured to generate image data for illustrating the position/posture determined by the position/posture determination unit.

Accordingly, the danger presentation device can generate data for presenting the posture of the robot at a time when the robot appears in the worker's view. Therefore, the danger presentation device can generate data for appropriately presenting a dangerous situation accompanied by the motion of the robot.

In addition, the danger presentation device may further include a dangerous area generation unit configured to generate a dangerous area according to the motion planning, the dangerous area being covered by movement of the robot, wherein the position/posture determination unit is configured to determine the position/posture at the specific time in a time period including a predicted time of a collision between the worker and the robot, based on the worker position and the motion planning, and the image generation unit is configured to generate the image data for illustrating the dangerous area and the position/posture determined by the position/posture determination unit.

Accordingly, the danger presentation device can generate data for illustrating the position and/or posture of the robot around the time when a collision is expected. That is to say, the danger presentation device can generate data for appropriately presenting a dangerous situation around the robot.

In addition, the position/posture determination unit may be configured to determine the position/posture at the specific time which is a time before the predicted time of the collision.

Accordingly, the danger presentation device can generate data for illustrating the position and/or posture of the robot at a time before the time when a collision is expected.

In addition, the position/posture determination unit may be configured to determine the position/posture at the specific time in which a distance between the worker position and a moving position of the robot is greater than or equal to a predetermined distance, the specific time being before the predicted time of the collision and closest to the predicted time of the collision.

Accordingly, a sufficient distance is provided between the position/posture of the robot and the worker. Consequently, the danger presentation device can generate data for presenting the position and posture of the robot more appropriately.

In addition, the position/posture determination unit may be configured to predict a position of the worker after an elapse of a predetermined time, as the worker position, based on the worker position acquired by the worker position acquisition unit, to predict the collision between the worker and the robot based on the predicted worker position and the motion planning, and to determine the position/posture at the specific time in a time period including the predicted time of the collision.

Accordingly, a collision between the robot and the worker is predicted more precisely. Therefore, data with higher precision is generated.

In addition, the position/posture determination unit may be configured to determine the position/posture at the specific time which is the predicted time of the collision.

Accordingly, the position and posture of the robot at the collision due to a movement of the worker is determined. Consequently, the situation of the collision is expressed more precisely.

In addition, the position/posture determination unit may be configured to determine the position/posture at the specific time in which a motion range covered by movement of the robot according to the motion planning during a predetermined time has an overlapping intersection with the view range with the overlapping intersection greater than or equal to a predetermined size, the specific time being after a predicted time of a first collision between the worker and the robot, and the specific time being closest to the predicted time of the first collision.

Accordingly, the robot has an overlapping intersection with the worker's view at a specific time with the overlapping intersection being greater than or equal to a predetermined size. Consequently, the danger presentation device can generate more appropriate data.

In addition, in the case where a collision between the worker and the robot is predicted, and there is no time applicable to the specific time, the position/posture determination unit may be configured to cause a warning device to output a warning.

Accordingly, in the case where the robot is outside the worker's view in spite of a possibility of a collision, the danger presentation device can inform the worker of a danger by presenting a warning such as a warning sound or a warning display.

In addition, in the case where the specific time is at or after a time at which the robot passes through the worker position which is acquired by the worker position acquisition unit, the position/posture determination unit may be configured to cause a warning device to output a warning.

Accordingly, when there is a possibility that the worker may not appropriately recognize a dangerous situation due to the timing of appearing of the robot in the worker's view, the danger presentation device can inform the worker of a danger by presenting a warning such as a warning sound or a warning display.

In addition, in the case where the specific time is before a time at which the robot passes through the worker position which is acquired by the worker position acquisition unit, the image generation unit may be configured to generate the image data.

Accordingly, when there is a possibility that the worker may not appropriately recognize a dangerous situation due to the timing of appearing of the robot in the worker's view, the danger presentation device can inform the worker of a danger by presenting a warning such as a warning sound or a warning display. When there is little possibility that the worker erroneously recognizes a dangerous situation, the danger presentation device generates data for illustrating the position and posture of the robot.

In addition, the danger presentation device may further include a worker orientation acquisition unit configured to acquire a worker orientation which is an orientation of a worker; and an obstruction information acquisition unit configured to acquire obstruction information which is information of an obstruction that obstructs the view range, wherein the worker view range determination unit is configured to determine the view range depending on the worker position acquired by the worker position acquisition unit, the worker orientation acquired by the worker orientation acquisition unit, and the obstruction information acquired by the obstruction information acquisition unit.

Accordingly, a detailed view range is determined based on the position, orientation of the worker, and information of an object blocking the view range. Therefore, more appropriate data is generated.

In addition, the image generation unit may be configured to generate the image data for illustrating the position/posture and a reaching time between a current time and the specific time.

Accordingly, the danger presentation device can generate data which indicates when the robot approaches the worker. That is to say, the danger presentation device can generate data which indicates a degree of danger.

In addition, the image generation unit may be configured to determine a display format for the position/posture depending on a reaching time between a current time and the specific time, and to generate the image data for illustrating the position/posture in the determined display format.

Accordingly, the danger presentation device can generate data according to a degree of danger.

In addition, the image generation unit may be configured to determine the display format so that a brightness when the reaching time is a first time is higher than a brightness when the reaching time is a second time which is longer than the first time, and to generate the image data for illustrating the position/posture in the determined display format.

Accordingly, the danger presentation device generates data which indicates the robot with a highlight image when a degree of danger is high. Therefore, the danger presentation device can indicate a degree of danger.

The danger presentation system according to the present invention may also include the danger presentation device.

Accordingly, a danger presentation system including the danger presentation device is achieved.

In addition, the danger presentation system may further include the robot which operates in accordance with the motion planning Accordingly, the danger presentation system can generate data for appropriately presenting a dangerous situation accompanied by the motion of the robot.

In addition, the danger presentation system may further include a display device configured to as an image present the image data generated by the image generation unit.

Accordingly, the display device can present data as an image, the data being generated by the danger presentation device. Consequently, a danger situation is presented appropriately.

In addition, the danger presentation system may further include a warning sound output device configured to output a warning sound.

Accordingly, the danger presentation system can output a warning sound for informing the worker of a danger when the position and/or posture of the robot cannot be presented in the view range of the worker.

In addition, a danger presentation method in the present invention may include acquiring a worker position which is a position of a worker; determining a view range of the worker depending on the worker position acquired in the acquiring; identifying a specific time in which at least a part of a robot which operates according to a motion planning is included in the view range and determining a position/posture which contains at least one of a position of the robot at the specific time and a posture of the robot at the specific time; and generating image data for illustrating the position/posture determined in the determining of the position/posture.

Accordingly, a danger presentation method is achieved.

In addition, a program in the present invention may cause a computer to execute: acquiring a worker position which is a position of a worker; determining a view range of the worker depending on the worker position acquired in the acquiring; identifying a specific time in which at least a part of a robot which operates according to a motion planning is included in the view range, and determining a position/posture which contains at least one of a position of the robot at the specific time and a posture of the robot at the specific time; and generating image data for illustrating the position/posture determined in the determining of the position/posture.

Accordingly, the danger presentation method is achieved as a program.

The present invention can generate data for appropriately presenting a dangerous situation accompanied by the motion of a robot.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings.

DETAILED DESCRIPTION OF THE INVENTION

Embodiment 1

A danger presentation system in Embodiment 1 presents a dangerous area to a worker so that the worker in the dangerous area can recognize the direction in which a robot is approaching the worker.

The danger presentation system in Embodiment 1 is for a rotary robot with one degree of freedom. A robot with one degree of freedom is an example of the robots to which the present invention is directed. The robots to which the present invention is directed include a robot with multiple degrees of freedom, a linear movement robot, a mobile robot, and a robot in combination thereof.

Figure 1:
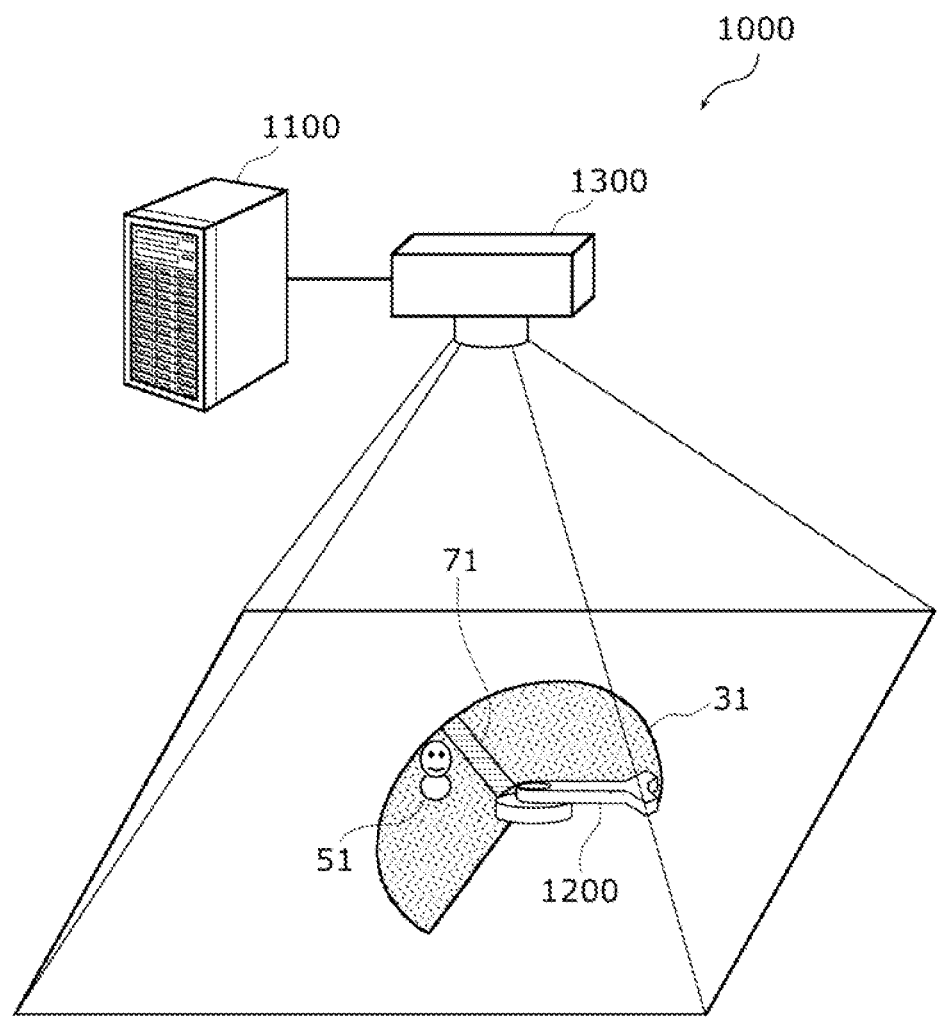
FIG. 1 is a conceptual diagram of a danger presentation system in Embodiment 1.

FIG. 1 is a conceptual diagram of the danger presentation system in Embodiment 1. The danger presentation system 1000 illustrated in FIG. 1 includes a danger presentation device 1100, a robot 1200, and a display device 1300. The danger presentation system 1000 projects a dangerous area 31 to the floor around a robot 1200. The danger presentation system 1000 projects the posture of the robot 1200 at a specific time. The danger presentation system 1000 may project a point illustrating the position of the robot 1200 at a specific time.

Accordingly, the danger presentation system 1000 presents a worker 51 a direction in which the robot 1200 is approaching. Hereinafter, the danger presentation system 1000 which achieves the above-described presentation is described.

Figure 2:
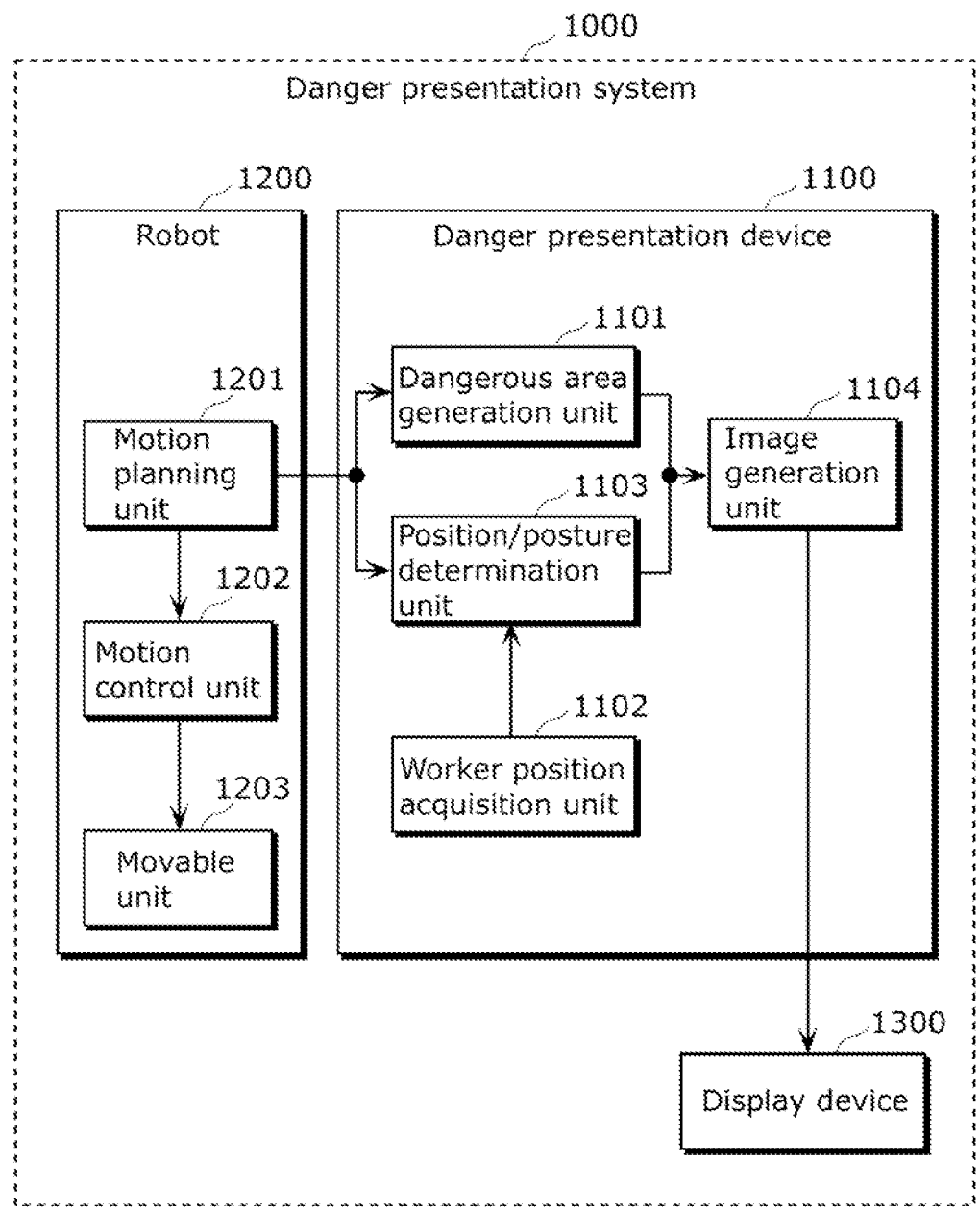
FIG. 2 is a general diagram of the danger presentation system in Embodiment 1.

FIG. 2 is a general diagram of the danger presentation system 1000 illustrated in FIG. 1. The danger presentation device 1100 includes a dangerous area generation unit 1101, a worker position acquisition unit 1102, a position/posture determination unit 1103, and an image generation unit 1104. The robot 1200 includes a motion planning unit 1201, a motion control unit 1202, and a movable unit 1203. Hereinafter, each component is described.

The movable unit 1203 is a unit which is physically movable in the robot 1200. The movable unit 1203 moves in a space in which a worker may come into contact with the movable unit 1203. For example, when the robot 1200 has an arm for moving an object, the arm is the movable unit 1203. When the main body of the robot 1200 moves, the main body is the movable unit 1203.

Figure 3:
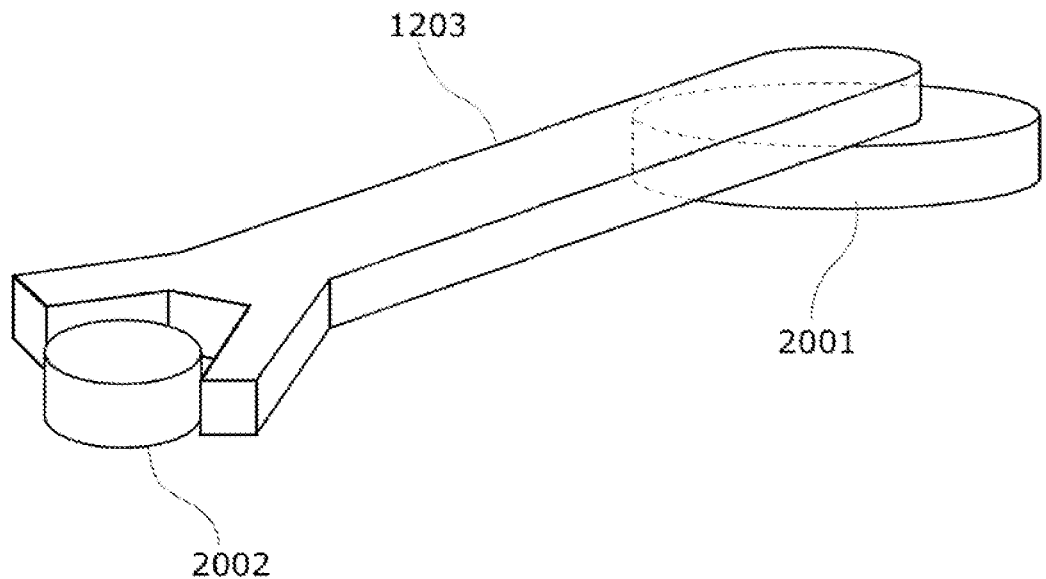
FIG. 3 is an outside view of a robot in Embodiment 1.

FIG. 3 is an outside view of the robot 1200 illustrated in FIG. 1. The robot 1200 includes a movable unit 1203, and a base unit 2001 which is not physically movable. The movable unit 1203 moves when carrying an object 2002. The motion planning unit 1201 and the motion control unit 1202 which are not illustrated in FIG. 3 are physically contained in the movable unit 1203 or the base unit 2001. The motion planning unit 1201 and the motion control unit 1202 may be contained in either one of the movable unit 1203 and the base unit 2001.

The motion planning unit 1201 outputs a motion planning which indicates how the movable unit 1203 moves. For example, the motion planning is a set of angles each indicating a rotation angle for which the movable unit 1203 is rotated, or a set of rotation angles which are ordered. In Embodiment 1, the motion planning is {R_0, R_1, R_2, ..., R_n} indicating a set of rotation angles of the movable unit 1203 at time 0, time 1, time 2, ..., time n, respectively where time 0 corresponds to an initial state.

Figure 4:
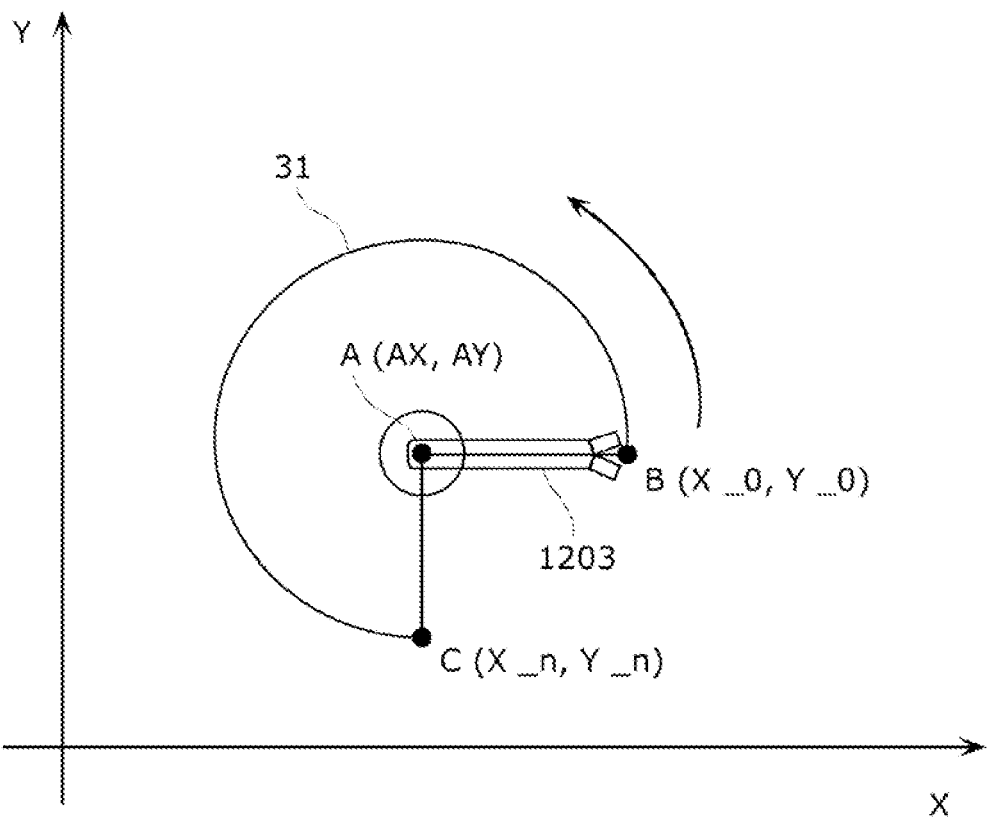
FIG. 4 is a diagram illustrating a rotation angle in Embodiment 1.

FIG. 4 is a diagram illustrating a rotation angle. The XY-plane illustrated in FIG. 4 is the horizontal plane containing the robot 1200 which is horizontally placed. A point A(AX, AY) indicates the center position of rotation of the movable unit 1203. A point B (X_0, Y_0) indicates the position of one end of the movable unit 1203 in an initial state. Here, the position of the one end of the movable unit 1203 is the position of the end of the movable unit 1203, which is opposite to the center position of rotation of the movable unit 1203. A point C (X_n, Y_n) indicates the position after the end of the movable unit 1203 is rotated for 270 degrees.

Here, the rotation angle is the angle formed by a first directed line segment AB and a second directed line segment AC, the first directed line segment AB having a starting point A(AX, AY) and an end point B(X_0, Y_0), and the second directed line segment AC having a starting point A(AX, AY) and an end point C(X_n, Y_n). The dangerous area 31 is the area covered by the first directed line segment AB when the first directed line segment AB is moved to the position of the second directed line segment AC based on the motion planning of the robot 1200. In the case where the worker 51 is in the dangerous area 31, there is a risk that the worker 51 could collide with the robot 1200.

A rotation angle with a positive value indicates a motion planning which rotates the movable unit 1203 counter clockwise. A rotation angle with a negative value indicates a motion planning which rotates the movable unit 1203 clockwise.

Figure 5:
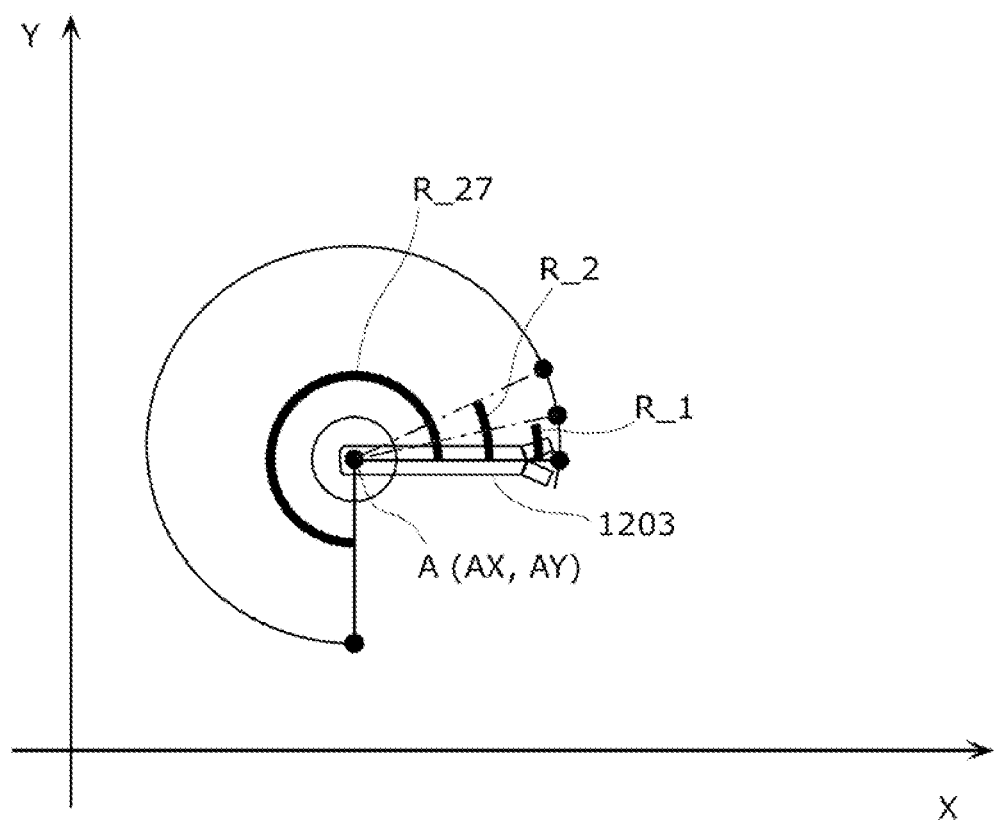
FIG. 5 is a diagram illustrating the relationship between time and the rotation angle in Embodiment 1.

FIG. 5 is a diagram illustrating an example of relationship between time and rotation angle. The rotation angle at time 1 is the rotation angle R_1 illustrated in FIG. 5, and is 10 degrees from the initial position of the robot 1200. The rotation angle at time 2 is the rotation angle R_2 illustrated in FIG. 5, and is 20 degrees from the initial position of the robot 1200. The rotation angle at time 27 is the rotation angle R_27 illustrated in FIG. 5, and is 270 degrees from the initial position of the robot 1200.

In the following description, the rotation angles contained in a set of ordered rotation angles are referred to as the 0th rotation angle, the 1st rotation angle, the 2nd rotation angle, ..., the n-th rotation angle starting form the first angle.

Here, the ordinal number starts with 0th rather than the 1st. Because the time starts with 0, so does the rotation angle. Accordingly the rotation angle at time 0 is R_0, thus the indexes of angle and time correspond to each other.

For example, time 0, time 1, . . . , time 27 with a time interval of 1 second are given, and the movable unit 1203 rotates for 270 degrees counter clockwise at 10 degrees per second, the motion planning is a set of rotation angles, {0, 10, 20, . . . , 270}.

Here, the above set of rotation angles is previously stored in the motion planning unit 1201. The motion planning unit 1201 outputs the rotation angle at a designated time in accordance with a request from the outside. That is to say, when time 0, time 1, time 2, . . . , time 27 are designated, the motion planning unit 1201 outputs 0, 10, 20, . . . , 270 as the rotation angles. Or when the 0th, the 1st, the 2nd, . . . , the 27th are designated, the motion planning unit 1201 outputs 0, 10, 20, . . . , 270 as the rotation angles.

The motion planning is expressed by angles with a predetermined time interval in the above, but may be a set of combination of time and rotation angle {(t0, Θ0), (t1, Θ1), (t2, Θ2), . . . (tn, Θn)}.

The motion planning unit 1201 may plan the movement of the robot 1200 based on an environmental map information previously held or ambient information acquired by a visual sensor. The motion planning unit 1201 does not need to directly plan the position of a movement destination of the movable unit 1203, but may plan a target movement speed, a target acceleration, and a target angle trajectory of a joint of the movable unit 1203.

The motion control unit 1202 moves the movable unit 1203 in accordance with the motion planning determined by the motion planning unit 1201.

The dangerous area generation unit 1101 forms the dangerous area 31 based on the motion planning determined by the motion planning unit 1201. Specifically, the dangerous area generation unit 1101 generates the dangerous area 31 by determining the area that is covered by the movable unit 1203 when the movable unit 1203 is moved in accordance with the motion planning of the motion planning unit 1201.

More specifically, the dangerous area 31 in FIG. 4 is described. First, the dangerous area generation unit 1101 previously holds the point A(AX, AY) as the position of the shaft of the movable unit 1203, and the point B(X_0, Y_0) as the position of the movable unit 1203 at time 0. Next, the dangerous area generation unit 1101 acquires the last rotation angle "270" held by the motion planning unit 1201.

Next, the dangerous area generation unit 1101 defines the dangerous area 31 as a set of point (X,Y) on the XY plane that satisfies the following two conditions.

The first condition is that the distance between the point (X, Y) and point A(AX, AY) is shorter than the distance between the point B(X_0, Y_0) and the point A(AX, AY). The second condition is that the angle formed by a first vector and a second vector is greater than or equal to 0 and less than or equal to "270" which is the last rotation angle in the motion planning, the first vector having the starting point A(AX, AY) and the end point B(X_0, Y_0), and the second vector having the starting point A(AX, AY) and the end the point (X, Y).

The dangerous area 31 determined in this manner is displayed by the display device 1300 illustrated in FIG. 1. The display device 1300 is a projector which is installed on the ceiling of a room in which the robot 1200 is disposed, and projects the dangerous area 31 and the later-described characteristic posture in a direction to the worker 51, i.e., the floor.

The dangerous area generation unit 1101 determines a sector only by the last rotation angle held by the motion planning unit 1201 in the above, but may determine, as the dangerous area 31, the sector area defined by the point A(AX, AY) and the two positions of the distal end of the movable unit 1203 corresponding to the k-th and (k−1)th rotation angles held by the motion planning unit 1201 (where k=1, 2, . . . , n). Alternatively, the dangerous area generation unit 1101 may determine, as the dangerous area 31, the triangle that is defined, as an approximation of the sector, by the point A(AX, AY) and the two positions of the distal end of the movable unit 1203 corresponding to the k-th and (k−1)th rotation angles held by the motion planning unit 1201 (where k=1, 2, . . . , n).

The worker position acquisition unit 1102 acquires the position of the worker 51. For example, an image-capturing unit (not shown) installed on the ceiling captures the worker 51, and the worker position acquisition unit 1102 acquires the worker 51 position using image processing technology. Alternatively, the position acquisition unit 1102 may acquire the worker 51 position by a position sensor (not shown) previously held by the worker 51.

The position/posture determination unit 1103 determines at least one (hereinafter also referred to as a position/posture) of the position (hereinafter also referred to as a characteristic position) of the robot 1200 to be presented to the worker 51, and a posture (hereinafter also referred to as a characteristic posture) of the robot 1200 to be presented to the worker 51. The position/posture determination unit 1103 then determines the position/posture so that the worker 51 can appropriately recognize a dangerous situation around the robot 1200. The characteristic position and/or the characteristic posture that are determined by the position/posture determination unit 1103 is presented to the worker 51 by the later-described display device 1300, the worker 51 being in a dangerous situation.

In Embodiment 1, the characteristic posture is the posture of the movable unit 1203 at the time a predetermined time before the predicted time of collision between the worker 51 and the movable unit 1203. The characteristic position is the point which is closest to the worker, the point among the points contained in the movable unit 1203. Here, a target time at which the characteristic posture is determined is not the time of collision, but a time before the collision. The danger presentation system 1000 appropriately informs the worker 51 of the direction in which the movable unit 1203 is approaching the worker 51 by presenting the position of the movable unit 1203 at a time before the collision.

The characteristic position may be the position which indicates the center of the robot 1200 or the movable unit 1203 at the target time. For example, when the entire robot 1200 moves, by the danger presentation system 1000 presenting the center position as the characteristic position, the worker 51 can recognize the direction in which the robot 1200 is approaching.

Figure 6:
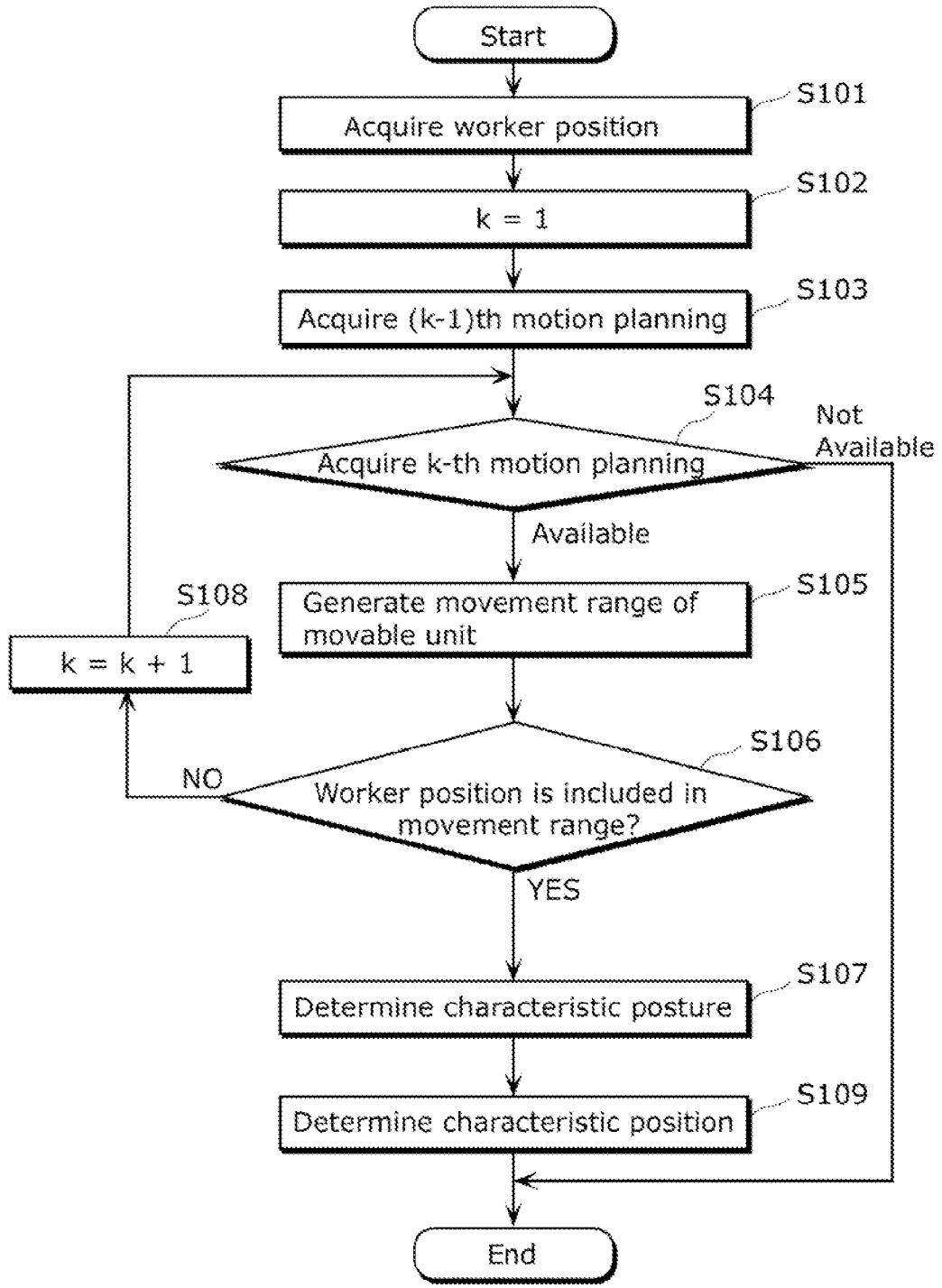
FIG. 6 is a flowchart illustrating the process in which a position/posture determination unit in Embodiment 1 determines a collision position for presentation.

FIG. 6 is a flowchart illustrating the flow of the process performed by the position/posture determination unit 1103 illustrated in FIG. 2. In the description, k is a variable, and is held by a storage area such as a register of CPU, a ROM, a RAM, or a HDD.

Figure 7:
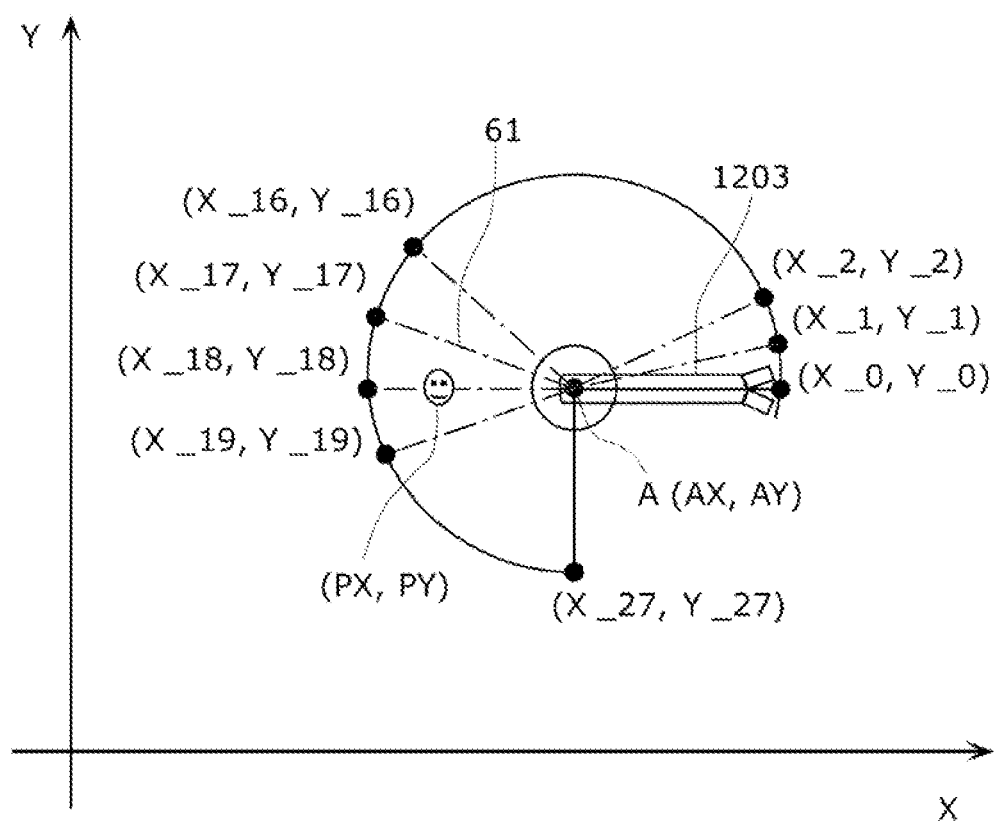
FIG. 7 is a graph illustrating a characteristic posture in Embodiment 1.

FIG. 7 is a diagram illustrating the characteristic posture 61 determined by the position/posture determination unit 1103. In FIG. 7, the point (X_0, Y_0), the point (X_1, Y_1), . . . , the point (X_27, Y_27) indicate the positions of the distal end of the movable unit 1203 at time 0, time 1, time 2, . . . , time 27, respectively. The point (PX, PY) indicates the worker position which is the worker 51 position acquired by the worker position acquisition unit 1102.

Hereinafter, the flow of the process performed by the position/posture determination unit 1103 is described with reference to FIGS. 6 and 7.

First, the position/posture determination unit 1103 acquires the worker 51 position by the worker position acquisition unit 1102 (S101). In the case of the example indicated in FIG. 7, the position/posture determination unit 1103 acquires the worker position (PX, PY).

Next, the position/posture determination unit 1103 set that k=(S102). Next, the position/posture determination unit 1103 acquires the motion planning at time (k−1) from the motion planning unit 1201 (S103). Because k=1 in this step, the position/posture determination unit 1103 acquires the 0th rotation angle "0." In the case of the example illustrated in FIG. 7, when k=1, the position/posture determination unit 1103 acquires the rotation angle "0" which corresponds to the position (X__0, Y__0).

Next, the position/posture determination unit 1103 acquires the motion planning at time k from the motion planning unit 1201 (S104). In the case of the example illustrated in FIG. 7, when k=1, the position/posture determination unit 1103 acquires the rotation angle "10" which corresponds to the position (X__1, Y__1); and when k=2, the position/posture determination unit 1103 acquires the rotation angle "20" which corresponds to the position (X__2, Y__2).

In the case where the k-th motion planning cannot be acquired from the motion planning unit 1201, the position/posture determination unit 1103 terminates the process. Specifically, when k=28, the motion planning unit 1201 does not hold the 28th motion planning in the example illustrated in FIG. 7. In this case, the position/posture determination unit 1103 terminates the process.

Here, as long as the motion planning unit 1201 has a motion planning, the position/posture determination unit 1103 continues to acquire a motion planning. However, in order to reduce processing amount, when the value of k reaches a certain value or more, the position/posture determination unit 1103 preferably terminates the process even when the motion planning unit 1201 still has a motion planning.

In the case where the k-th motion planning can be acquired from the motion planning unit 1201, the position/posture determination unit 1103 generates a range (also referred to as a movement range or a motion range) covered by the movable unit 1203 that moves during a time period from time (k−1) to time k (S105).

Here, the position/posture determination unit 1103 generates a sector containing the following three points. First, the first point which is the sector center is the rotation center point A(AX, AY) of the movable unit 1203. The second point is the point (X_k−1, Y_k−1) which is the position of the distal end of the movable unit 1203 at time (k−1). That is to say, the second point is the position of the distal end of the movable unit 1203 in the (k−1)th rotation angle of the motion planning unit 1201. The third point is the point (X_k, Y_k) which is the position of the distal end of the movable unit 1203 at time k. That is to say, the third point is the position of the distal end of the movable unit 1203 in the k-th rotation angle of the motion planning unit 1201.

Specifically, when k=1 in the example illustrated in FIG. 7, the position/posture determination unit 1103 generates the sector defined by (AX, AY), (X__0, Y__0), and (X__1, Y__1). When k=18, the position/posture determination unit 1103 generates the sector defined by (AX, AY), (X__17, Y__17), and (X__18, Y__18).

Next, the position/posture determination unit 1103 determines whether or not the worker 51 position acquired from the worker position acquisition unit 1102 is included in the movement range of the movable unit 1203 (S106).

Specifically, when k=1 in the example illustrated in FIG. 7, the worker position is not included in the sector. Then k is incremented sequentially from 1, and when k=18, the worker position is included in the movement range (a sector) of the movable unit 1203 defined by the point A(AX, AY), the point (X__17, Y__17), and the point (X__18, X__18). Thus, when k=0, 1, 2, . . . , 17, the position/posture determination unit 1103 determines that the worker 51 position is not included in the movement range of the movable unit 1203, and when k=18, the position/posture determination unit 1103 determines that the worker 51 position is included in the movement range of the movable unit 1203.

When the worker position is not included in the movement range (NO in S106), the position/posture determination unit 1103 stores the value k incremented by 1 to k (S108). The position/posture determination unit 1103 acquires the motion planning at time k from the motion planning unit 1201 (S104), and subsequent process is repeated.

When the worker position is included in the movement range (YES in S106), the position/posture determination unit 1103 determines the posture of the movable unit 1203 at time (k−1) as the characteristic posture (S107). That is to say, when k=18 in the example illustrated in FIG. 7, the characteristic posture is defined by the posture of the movable unit 1203 when k=17 because the worker position is included in the sector. More specifically, the position/posture determination unit 1103 defines the characteristic posture as line segment joining the point A(AX, AY) and the point (X__17, Y__17).

Here, a target time at which the characteristic posture is determined is not the time of collision, but a time before the collision. Accordingly, the danger presentation system 1000 can appropriately inform the worker 51 of the direction in which the movable unit 1203 is approaching the worker 51 by presenting the position of the movable unit 1203 at a time before the collision. Time (k−1) is just an example, and the time at which the characteristic posture is determined may be a time before time (k−1).

To set a target time, the position/posture determination unit 1103 may measure the distance between the line segment of the characteristic posture and the worker 51 position at time k−1, time k−2, . . . , 0, and then sets the target time as the measurement time for which the measured distance reaches a predetermined distance or more for the first time in the above order of the measurement times. It is easier for the worker 51 to recognize a dangerous situation with a characteristic posture away from the worker 51 by a predetermined distance or more.

Next, the position/posture determination unit 1103 determines a characteristic position (S109). That is to say, the position/posture determination unit 1103 determines a point on the line segment joining the point A(AX, AY) and the point (X__17, Y__17) as the characteristic position, the point being closest to the worker position (PX, PY).

The image generation unit 1104 generates an image which illustrates the dangerous area 31 generated by the dangerous area generation unit 1101, and the characteristic determined by the position/posture determination unit 1103. That is to say, the image generation unit 1104 superimposes the characteristic posture and position determined by the position/posture determination unit 1103 on the dangerous area 31 generated by the dangerous area generation unit 1101.

The display device 1300 is a device that displays an image generated by the image generation unit 1104.

Figure 8:
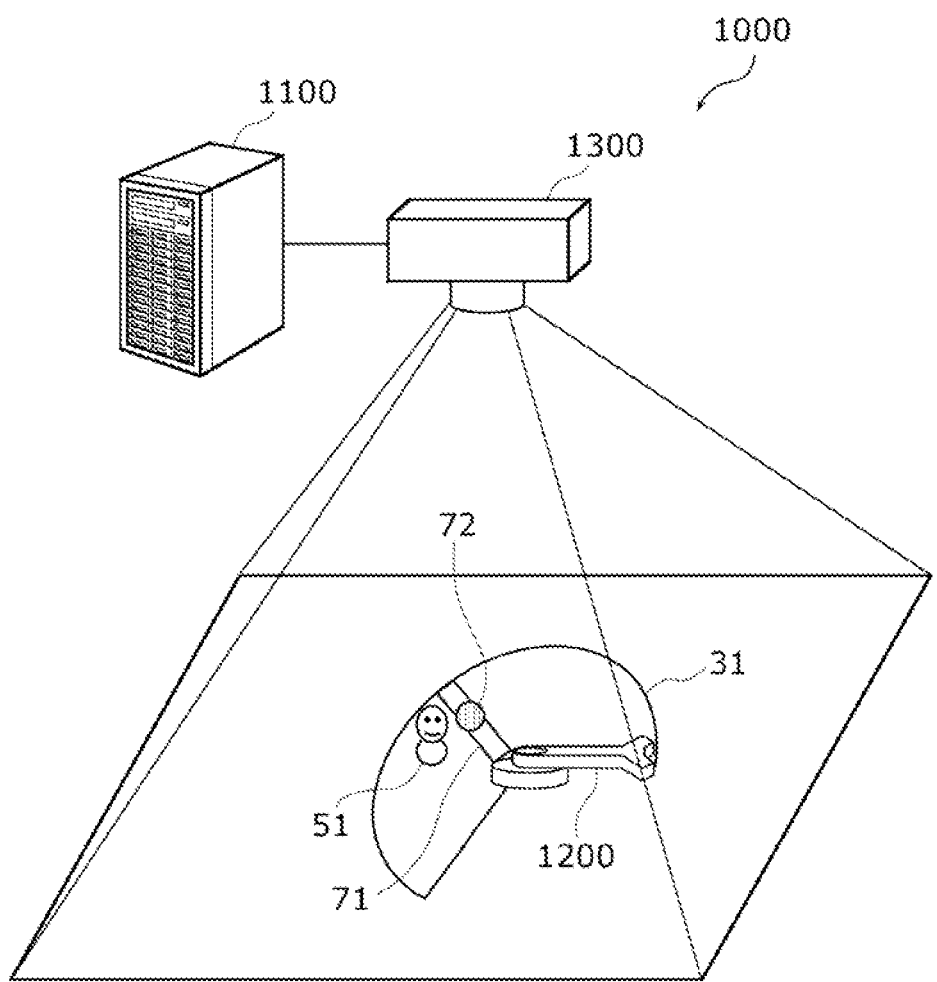
FIG. 8 is a diagram illustrating an image displayed by the danger presentation system in Embodiment 1.

FIG. 8 is a diagram illustrating how the display device 1300 displays an image generated by the image generation unit 1104. The display device 1300 installed at the upper portion of a room in which robot 1200 is disposed presents the dangerous area 31 around the robot 1200. In addition, the display device 1300 presents the images of a characteristic posture 71 and a characteristic position 72.

In the above manner, the dangerous presentation system 1000 in Embodiment 1 presents the dangerous area 31 around the robot 1200. In addition, the danger presentation system 1000 presents the image of the characteristic posture 71.

The worker 51 can recognize the dangerous area 31 where the movable unit 1203 of the robot 1200 moves. However, the direction in which the robot is approaching the worker 51 cannot be recognized only with the dangerous area 31. Thus, when the worker 51 tries to escape from the dangerous area 31, the worker 51 may accidentally approach the movable unit 1203.

The worker 51 can recognize the direction in which the movable unit 1203 is approaching with the characteristic posture. However, the worker 51 cannot recognize the direction in which the movable unit 1203 moves after approaching the worker 51. Consequently, the worker 51 may keep dodging to avoid the movable unit 1203 within the motion space of the movable unit 1203.

However, the worker 51 can determine in which direction the worker 51 should move to secure safety by recognizing the dangerous area 31 and the characteristic posture that are displayed by the danger presentation system 1000 in Embodiment 1.

Embodiment 2

The danger presentation system in Embodiment 1 presents a dangerous area to a worker in the dangerous area. The dangerous presentation system in Embodiment 2 further presents a dangerous area to a worker who is currently not in the dangerous area, but may move to the dangerous area later.

Figure 9:
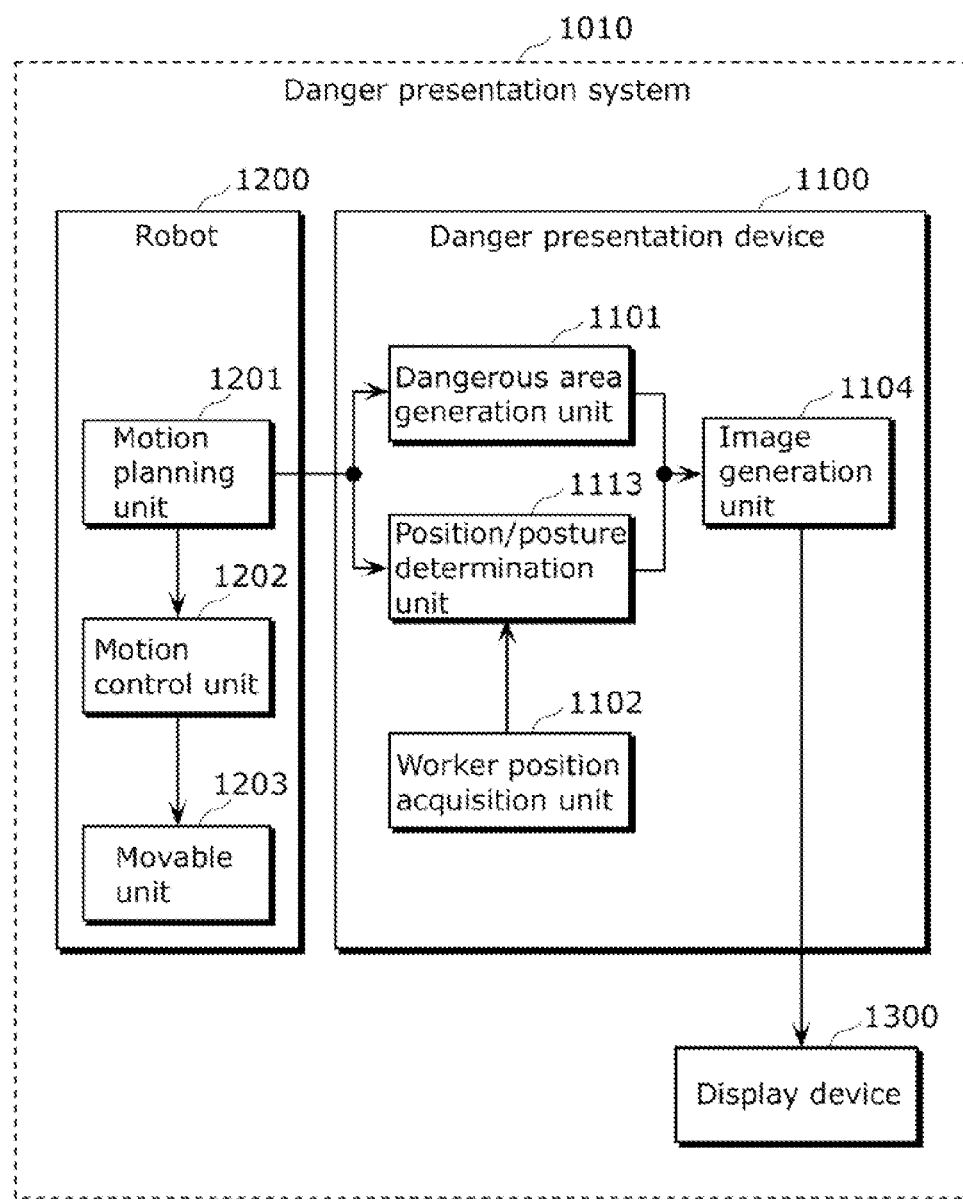
FIG. 9 is a general diagram of a danger presentation system in Embodiment 2.

FIG. 9 is a general diagram of the dangerous presentation system in Embodiment 2. A dangerous presentation system 1010 in Embodiment 2 includes a danger presentation device 1110, a robot 1200, and a display device 1300. The dangerous presentation device 1110 includes a position/posture determination unit 1113 whose operation is different from the operation of the position/posture determination unit 1103 in Embodiment 1. Other components are the same as those of Embodiment 1, and description is omitted.

Figure 10:
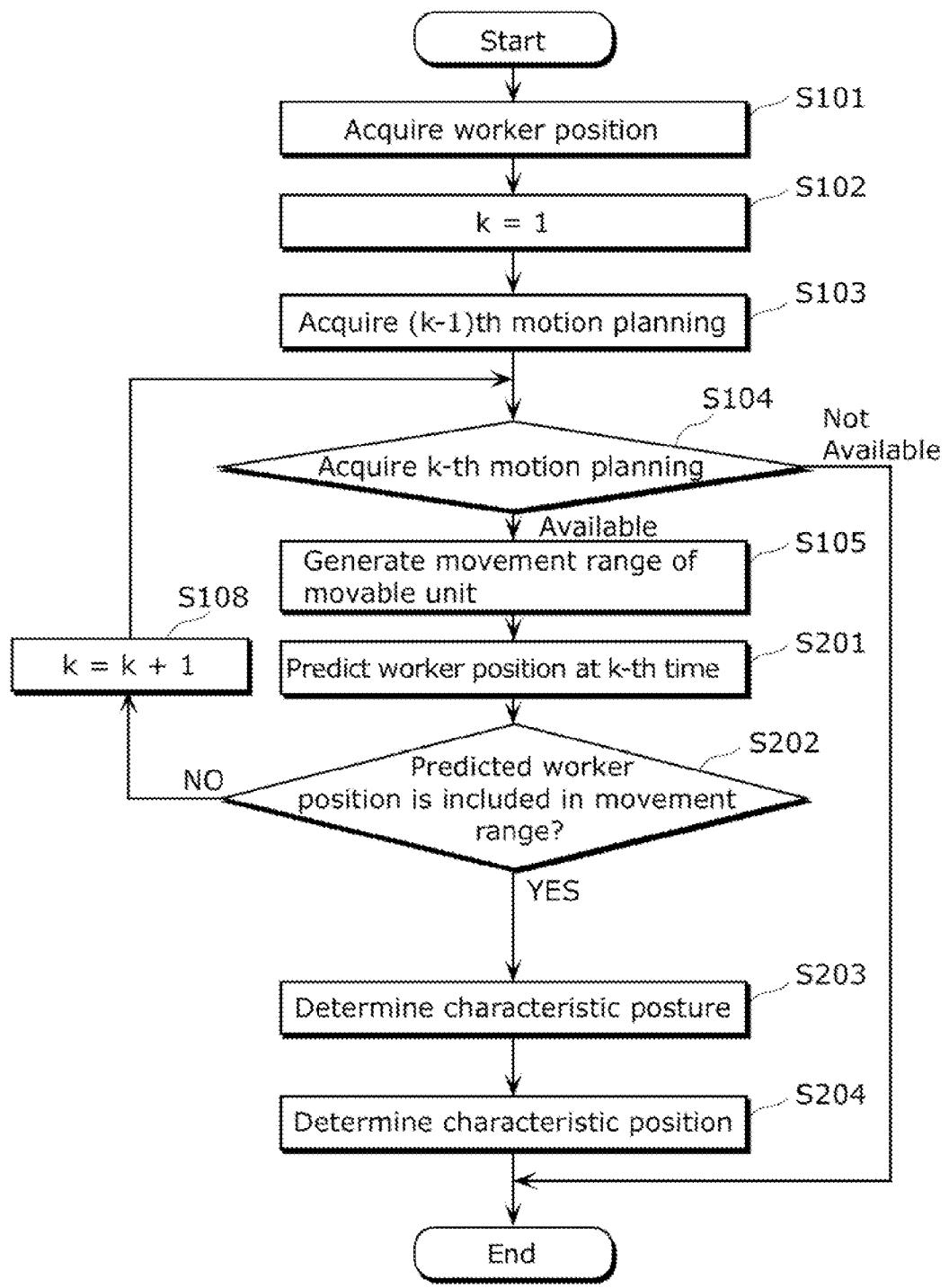
FIG. 10 is a flowchart illustrating the process in which a position/posture determination unit in Embodiment 2 determines a collision position for presentation.

FIG. 10 is a flowchart illustrating the process of determination of a collision position for presentation, the determination being made by the position/posture determination unit 1113 illustrated in FIG. 9.

Figure 11:
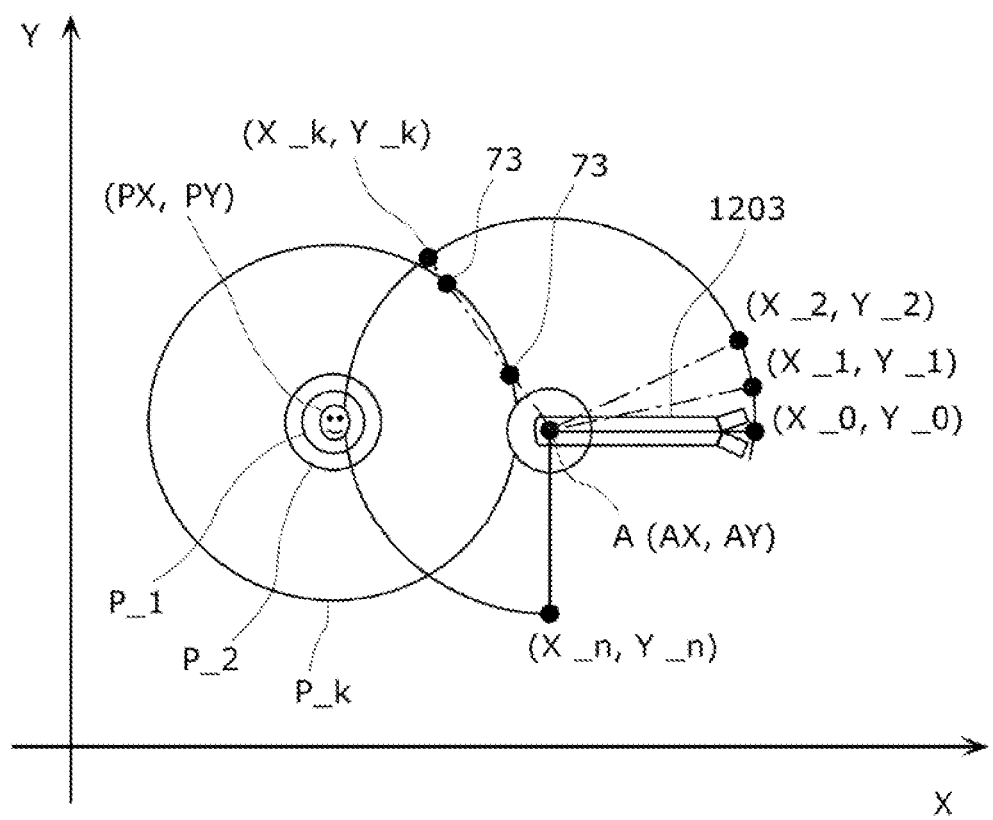
FIG. 11 is a graph illustrating the relationship between a movement range of a movable unit and a predicted worker position in Embodiment 2.

FIG. 11 is a graph illustrating the relationship between the movement range of the movable unit 1203 and predicted worker position. Hereinafter, the flow of the process performed by the position/posture determination unit 1113 is described with reference to FIGS. 10 and 11.

First, the position/posture determination unit 1113 acquires a worker position (S101). Next, the position/posture determination unit 1113 sets variable k to 1 (S102). Next, the position/posture determination unit 1113 acquires the (k−1)th motion planning (S103). Next, the position/posture determination unit 1113 tries to acquire the k-th motion planning and determines whether or not the k-th motion planning can be acquired (S104).

The position/posture determination unit 1113, when being unable to acquire the motion planning, terminates the process, and when being able to acquire the motion planning, generates the movement range of the movable unit 1203 (S105). So far, the position/posture determination unit 1113 performs the same process as that in Embodiment 1 illustrated in FIG. 6.

The position/posture determination unit 1113 generates the movement range of the movable unit 1203 (S105), and then predicts the position of the worker at the k-th time (S201). For example, the position/posture determination unit 1113 previously holds an average moving speed V of the worker, and predicts that the worker is in a range which is a set of points whose distance from the initial position is less than or equal to k×V at time k. In FIG. 11, P_1, P_2, . . . , P_k indicate predicted positions of the worker at time 1, time 2, . . . , time k, respectively, with time 0 corresponding to the initial state. The circles for indicating corresponding predicted positions have the center at the worker position (PX, PY), and radii of 1×V, 2×V, . . . , k×V, respectively.

The position/posture determination unit 1113 then calculates whether or not part of the predicted position of the worker is included in the movement region of the movable unit 1203. Specifically, the position/posture determination unit 1113 determines whether or not there is a point which is included in the sector illustrating the movement region of the movable unit 1203 as well as in the circle illustrating the predicted position of the worker (S202).

When the predicted position of the worker is not in the movement range (NO in S202), the position/posture determination unit 1113 stores the value of k incremented by 1 into k similarly to Embodiment 1 illustrated in FIG. 6 (S108).

When the predicted position of the worker is included in the movement range (YES in S202), the position/posture determination unit 1113 determines the position of the movable unit 1203 at time k as the characteristic posture (S203). That is to say, when k=18, the predicted position of the worker is included in the sector, the position/posture determination unit 1113 determines the position of the movable unit 1203 at time 18 as the characteristic posture. More specifically, the position/posture determination unit 1113 determines the line segment joining the point A(AX, AY) and the point (X_18, Y_18) as the characteristic posture.

When the characteristic posture is determined, the position/posture determination unit 1103 in Embodiment 1 uses a time before the predicted time of collision to determine the characteristic posture, however, the position/posture determination unit 1113 in Embodiment 2 may use the predicted time of collision to determine the characteristic posture. Even when the predicted time of collision is used, the position/posture determination unit 1113 can present in which direction of movement, the worker comes into contact with the movable unit 1203, by predicting the position of the worker in motion.

The position/posture determination unit 1113 may determine the characteristic posture on the basis of a time before the predicted time of a collision similarly to Embodiment 1. Accordingly, the danger presentation system 1010 can present the direction in which the movable unit 1203 is approaching more reliably.

Next, the position/posture determination unit 1113 determines a predicted position a collision at time k as the characteristic position (S204). For example, the position/posture determination unit 1113 determines, as the characteristic position, the overlapping intersection between the circle illustrating the predicted position of the worker and the line segment illustrating the characteristic posture. In the example illustrated in FIG. 11 two characteristic positions 73 exist. The position/posture determination unit 1113 may determine both or either one of the two characteristic positions 73 as the characteristic position.

The position/posture determination unit 1113 may determine the center of the two characteristic positions 73 as the characteristic position. The center of the two characteristic positions 73 is the closest to the position (PX, PY) of the worker, thus has high possibility of a collision with the worker.

The characteristic posture and characteristic position determined in this manner are presented by the danger presentation system 1010.

As described above, the danger presentation system 1010 in Embodiment 2 presents the dangerous area 31 around the robot 1200. The danger presentation system 1010 further presents an image of the movable unit in the characteristic posture 71. By recognizing the dangerous area and the characteristic posture displayed by the dangerous presentation system 1010, the worker 51 can determine in which direction the worker 51 should move to secure safety.

The worker 51 when moving near the robot 1200, may move into more dangerous area than before. However, the danger presentation system 1010 can present to the worker 51 which direction of movement would create a risk of collision with the robot 1200 by predicting the movement of the worker 51.

Embodiment 3

When there is possibility of collision between a worker and a robot, the danger presentation system in Embodiment 1 and Embodiment 2 displays, as a characteristic position, a certain place where the worker may collide with the robot at an earliest possible time, or presents the posture of the robot at the time of collision as a characteristic posture. However, the worker may not be able to view the presented characteristic position or characteristic posture depending on the direction in which the worker faces. The danger presentation system in Embodiment 3 presents a characteristic position or a characteristic posture in the area which can be viewed by a worker in consideration of the direction in which the worker faces.

Figure 12:
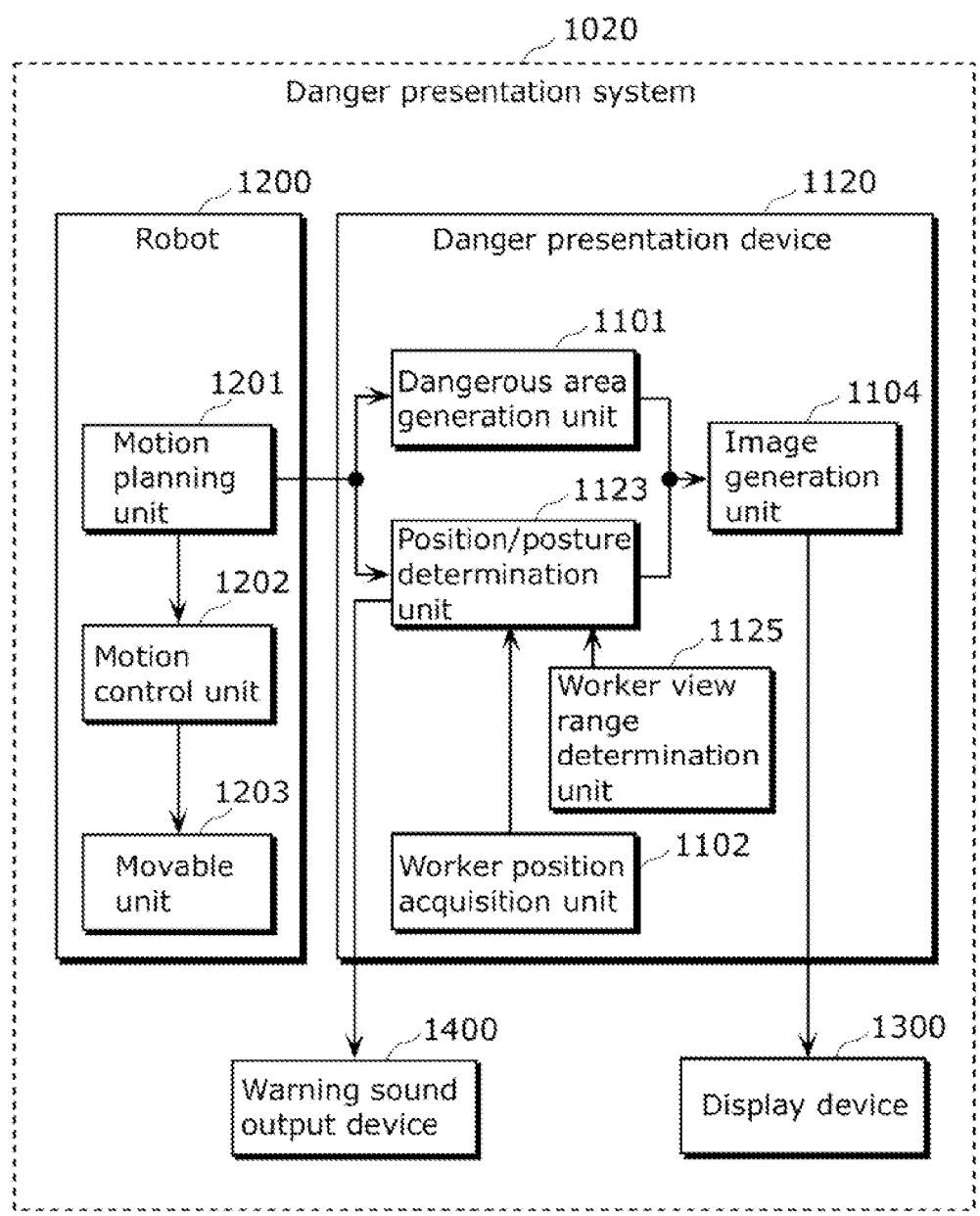
FIG. 12 is a general diagram of a danger presentation system in Embodiment 3.

FIG. 12 is a general diagram of a danger presentation system 1020 in Embodiment 3. The danger presentation system 1020 in Embodiment 3 includes a danger presentation device 1120, a robot 1200, a display device 1300, and a warning sound output device 1400. The danger presentation device 1120 includes a position/posture determination unit 1123 whose operation is different from the operation of the position/posture determination unit 1103 in Embodiment 1. The danger presentation device 1120 further includes a worker view range determination unit 1125. Other components are the same as those of Embodiment 1, and description is omitted.

The worker view range determination unit 1125 determines the view range of the worker (also referred to as a view, a view area, or a worker view range) based on the orientation of the posture of the worker. The worker view range determination unit 1125 determines the view range of the worker under the assumption that, for example, a worker wears a helmet equipped with a position sensor each in the front and in the back, and looks in the direction of the line joining the positions acquired by the two sensors.

Figure 13:
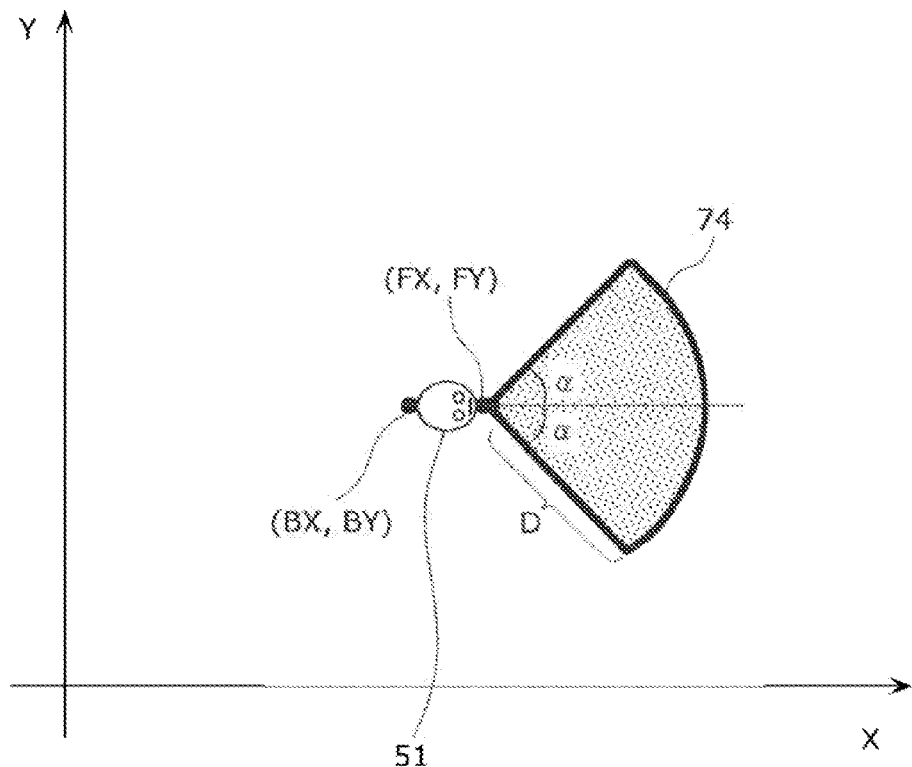
FIG. 13 is a graph illustrating a view range of a worker in Embodiment 3.

FIG. 13 is a diagram illustrating the view area determined based on the values acquired from the position sensor. The worker front position (FX, FY) indicates the position of the position sensor installed in front of the helmet, and the worker back position (BX, BY) indicates the position of the position sensor installed on the back of the helmet.

The worker view range determination unit 1125 determines, as the view range, a sector (view 74 illustrated in FIG. 13) which is part of the circle with the center at the worker front position (FX, FY) and the radius of D, the sector being formed by rotating the radius in the direction through the worker back position (BX, BY) and the worker front position (FX, FY) for a rotation angle α clockwise and counter clockwise.

The worker view range determination unit 1125 may determine the radius D based on the concept of personal space. "Personal space is an area around the body of a human or an animal, and if other human or animal of the same species comes into the area, a negative response is normally caused. (Psychology Dictionary, edited by Tamotsu Fujinaga, and Mariko Naka, Maruzen, 2004)"

Now, the danger presentation system 1020 can make a worker have a desire to escape from the area by presenting the characteristic posture and characteristic position of the robot within the range of personal space.

Edward Hall has shown that personal space changes based on the intimacy of the relationship between you and other human. Here, it is generally expected that an intimate feeling of a worker to a robot increases as an increase in the number of times the robot is used, the number of times the robot is touched, and the time period during which the robot is observed by the worker. Then, the worker view range determination unit 1125 may narrow the personal space and the view 74 based on the number of times of the use, touch, and the observation time of the robot.

That is to say, the danger presentation system 1020 includes a unit to acquire the number of times of use, touch, and the observation time of the robot, and the worker view range determination unit 1125 may reduce the radius D in accordance with an increase in the number of times of use, touch, and the observation time of the robot. For example, for a worker who has an intimate feeling to the robot, the radius D is set to 45 cm, and for a worker who has no intimate feeling to the robot, the radius D is set to 120 cm or 350 cm.

In addition, the distance of personal space changes depending on the race and the character of a target worker. Thus, the danger presentation system 1020 may include a unit to acquire the race and the character of a target worker, and the worker view range determination unit 1125 may determine based on the race and the character of a target worker.

The worker view range determination unit 1125 may determine a view area by estimating the position of a camera installed in front of the helmet based on the image obtained from the camera. Here, instead of a helmet, the camera may be installed on an eyeglass, a bag carried by the worker, or a wheelchair in the case where the worker is in the wheelchair. Alternatively, the worker view range determination unit 1125 may estimate the view direction of the worker based on the position of the eyes of the worker by capturing the worker's face with a camera installed indoors.

The danger presentation system 1020 in Embodiment 3 presents a characteristic position or a characteristic posture to the view 74, however, in some cases, the characteristic position or the characteristic posture cannot be presented to the view 74, or it is better not to present the characteristic position or the characteristic posture to the view 74. Hereinafter, specific description is given.

Figure 14:
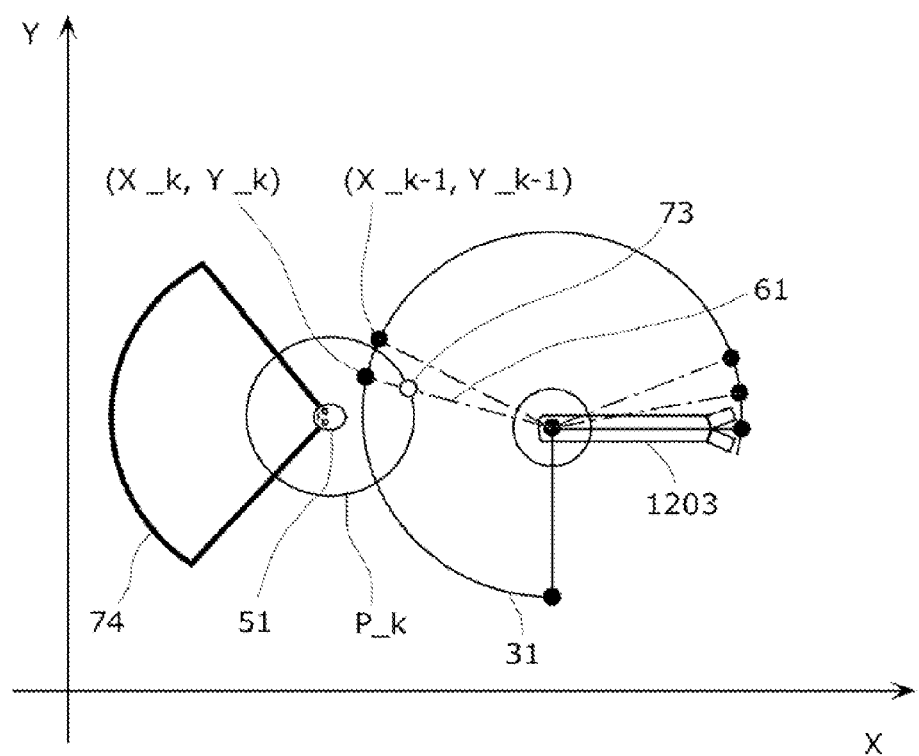
FIG. 14 is a diagram illustrating a view range of a worker who faces away from a robot in Embodiment 3.

FIG. 14 is a diagram illustrating a view range of a worker who faces away from a robot in Embodiment 3.

The worker 51 is outside the dangerous area 31. The view 74 of the worker 51 is not overlapped with the dangerous area 31. However, because of the movement of the worker 51, a collision at time k is predicted.

In this case, even when the danger presentation system 1020 presents an image of the characteristic posture 61 and the characteristic position 73, the image does not appear in the view 74 of the worker 51. Thus, in this case, the danger presentation system 1020 causes the output device 1400 to output a warning sound in order to inform the worker 51 of a danger. A configuration may be made such that when a danger is notified to the worker 51, a message such as "a robot is approaching from the back" is presented in the view range of the worker 51 by using the display device 1300 instead of using the warning sound output device 1400. Alternatively, a configuration may be made so as to inform the worker 51 of an approach of a robot from the back by blinking the output image of the display device 1300.

When a warning sound is outputted, a message is presented, or a blinking display is shown constantly without adopting the above-mentioned configuration, attention of a worker may be reduced because of because of too frequent warnings. However, by adopting such a configuration described above, the worker receives those warnings only when the presentation of a danger by showing the characteristic posture is not effective. Consequently, attention of the worker increases, and the worker can make a more effective determination for a danger of collision such as a collision with a robot approaching from the back.

Figure 15:
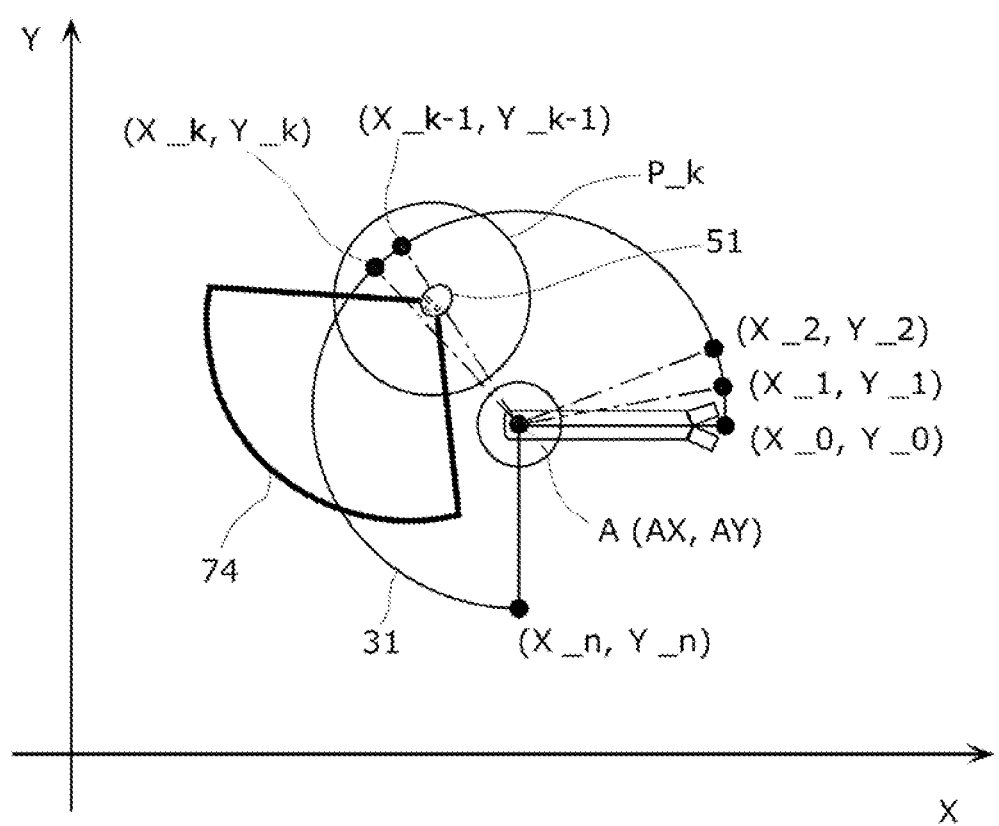
FIG. 15 is a diagram illustrating a view range of a worker who faces in the same direction as the movement direction of a movable unit in Embodiment 3.

FIG. 15 is a diagram illustrating a view range of the worker 51 who faces in the same direction as the movement direction of the movable unit 1203 in Embodiment 3.

The worker 51 is inside the dangerous area 31. However, because of the movement of the worker 51, a collision of the worker 51 with the movable unit 1203 is predicted at time k−1. However, the movable unit 1203 does not appear in the view 74 at time k−1. The danger presentation system 1020 in Embodiment 3 presents the characteristic position or the characteristic posture in an area which can be viewed by the worker 51, thus does not determine the posture of the robot 1200 at time k−1 as the characteristic posture.

Next, a collision of the worker 51 with the movable unit 1203 at time k is predicted. The movable unit 1203 appears in the view 74 at time k−1. When the position and posture of the robot 1200 at time k are presented to the worker 51 as the characteristic position and the characteristic posture, there is a possibility that the worker 51 erroneously recognizes that the movable unit 1203 of robot 1200 is approaching from the front.

Therefore, the danger presentation system 1020 does not present the characteristic position or the characteristic posture at the time when the robot 1200 passes through the position of the worker 51, or at the later time. In this case, the danger presentation system 1020 causes the warning sound output device 1400 to output a warning sound in order to inform the worker 51 of a danger. Alternatively, the danger presentation system 1020 causes the display device 1300 to output a warning.

As described above, the display device 1300 and the warning sound output device 1400 may serve as a warning device which outputs a warning. The display device 1300 and the warning sound output device 1400 are examples of a warning device, thus the danger presentation system 1020 may include another warning device. The danger presentation device 1120 may include a warning device which outputs a warning.

Figure 16:
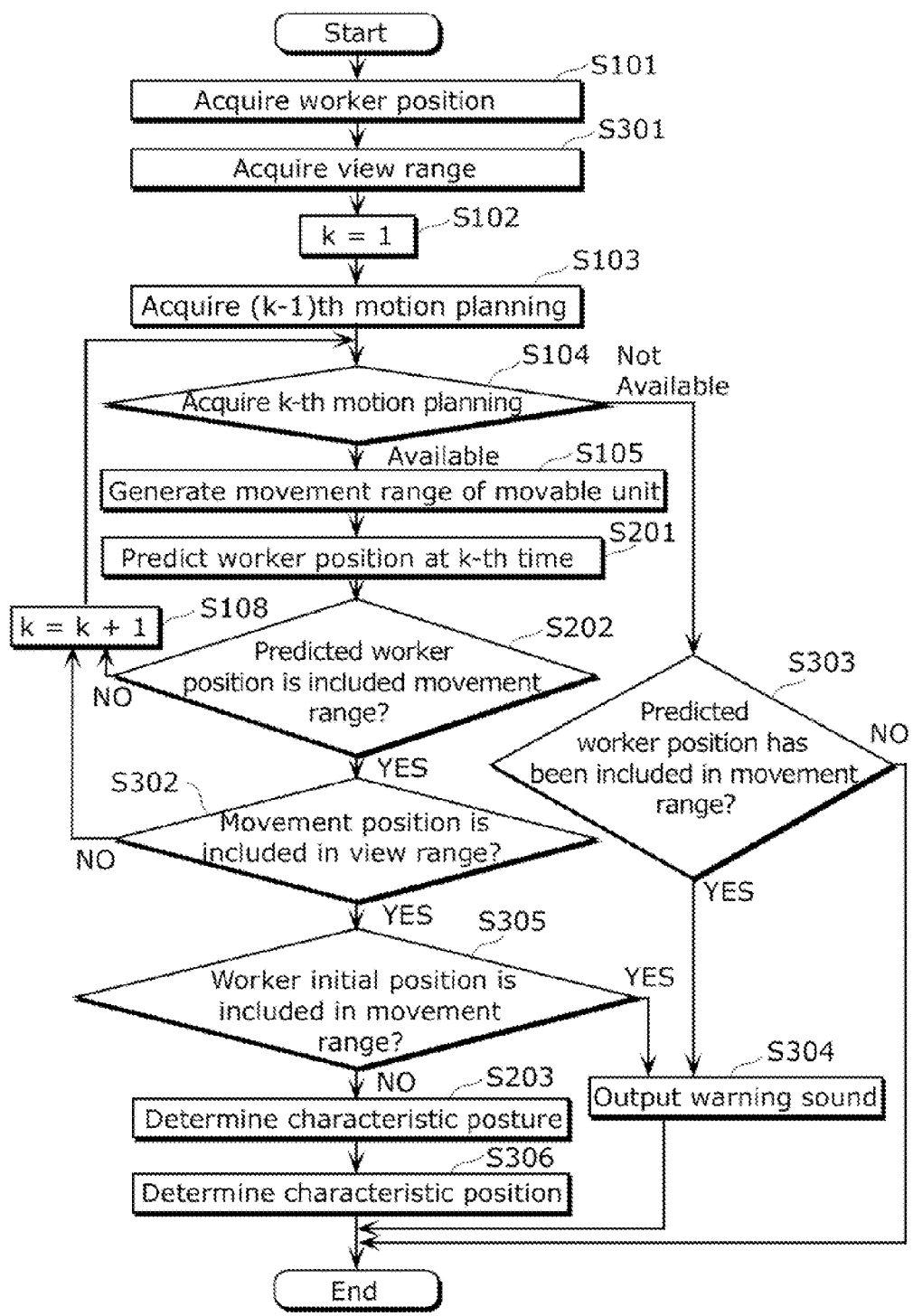
FIG. 16 is a flowchart illustrating the process in which a position/posture determination unit in Embodiment 3 determines a collision position for presentation.
Figure 17:
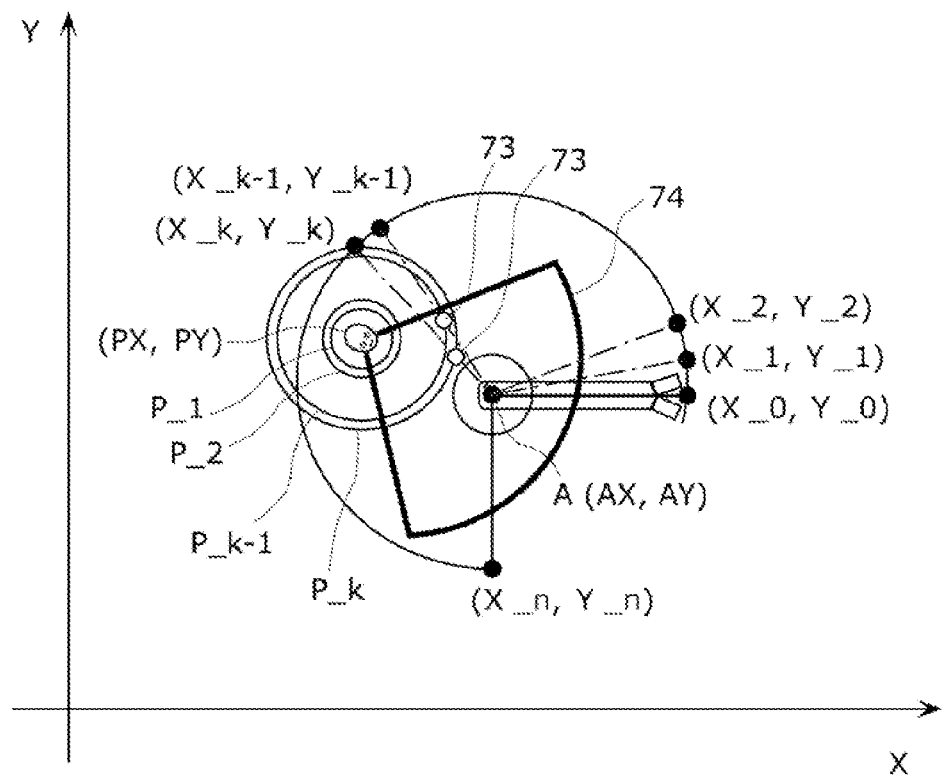
FIG. 17 is a graph illustrating the relationship between a movement range of a movable unit and a predicted worker position in Embodiment 3.

FIG. 16 is a flowchart illustrating the process in which the position/posture determination unit 1123 illustrated in FIG. 12 determines a collision position for presentation. FIG. 17 is a graph illustrating the relationship between the movement range of the movable unit 1203 and a predicted worker position in Embodiment 3. Hereinafter, the flow of the process performed by the position/posture determination unit 1123 is described with reference to FIGS. 16 and 17.

Because the process of acquiring the worker position (S101), the process of setting the variable k to 1 (S102), the process of acquiring the (k−1)th motion planning (S103), the process of acquiring the k-th motion planning (S104), the process of generating a movement range of the movable unit 1203 (S105), and the process of adding 1 to k (S108) that are illustrated in FIG. 16 are the same as respective processes in Embodiment 1 illustrated in FIG. 6, description of those processes in FIG. 16 is omitted.

In addition, the process of predicting the worker position at the k-th time (S201), the process of determining whether or not the predicted worker position is included in the movement range (S202), and the process of determining a characteristic position (S203) that are illustrated in FIG. 16 are the same as the respective processes in Embodiment 2 illustrated in FIG. 10, thus description of the those processes in FIG. 16 is omitted.

The position/posture determination unit 1123, after acquiring a worker position (S101), determines a view range by using the worker view range determination unit 1125 (S301).

When the predicted worker position is included in the movement range (YES in S202), the position/posture determination unit 1123 determines whether or not part of the view area is included in part of the movement range (S302). Specifically, the position/posture determination unit 1123 determines whether or not at least a predetermined number of points (X, Y) on the XY plane satisfy the following two conditions:

The first condition is that the point (X, Y) is a point in a movement range acquired by the process (S105) of generating the movement range of the movable unit 1203.

The second condition is that the point (X, Y) is a point in a view area acquired by the process (S301) of acquiring the view area.

Here, when the view area is not contained in part of the movement range (NO in S302), the position/posture determination unit 1123 stores the value k incremented by 1 to k (S108).

On the other hand, when the view area is contained in part of the movement range (YES in S302), the position/posture determination unit 1123 determines whether or not the initial position of the worker is included in the movement range (S305).

Here, when the worker's initial position is included in the movement range (YES in S305), as in the example illustrated in FIG. 15, there is a possibility that the worker erroneously recognizes the moving direction of the robot 1200 by displaying the posture of the robot 1200 after the movement. Thus, in this case, the position/posture determination unit 1123 causes the warning sound output device 1400 to output a warning sound (S304). The position/posture determination unit 1123 may cause the display device 1300 to output a warning via the image generation unit 1104. The position/posture determination unit 1123 may cause the display device 1300 to directly output a warning not via the image generation unit 1104.

On the other hand, when the worker's initial position is not included in the movement range (NO in S305), the position/posture determination unit 1123 determines the characteristic posture similarly to Embodiment 2 (S203).

The position/posture determination unit 1123 then determines a characteristic position (S306). Here, the position/posture determination unit 1123 may determine a characteristic position similarly to Embodiment 2. Alternatively, the position/posture determination unit 1123 may determine a portion near the center of the view as the characteristic position.

When the k-th motion planning cannot be acquired by the process (S104) of acquiring the k-th motion planning, the position/posture determination unit 1123 determines whether or not there has been a state in which the predicted worker position is included in the movement range (S303). That is to say, the position/posture determination unit 1123 determines whether or not it has been determined that a predicted worker position is included in the movement range in the determination of whether or not a predicted worker position is included in the movement range (S202).

Specifically, the position/posture determination unit 1123 prepares a variable with an initial value of 0, and when a predicted worker position is included in the movement range (YES in S202), the position/posture determination unit 1123 substitutes 1 for the variable. When the value of the variable is 1, the position/posture determination unit 1123 determines that there has been a state in which a predicted worker position is included in the movement range (YES in S303), and when the value of the variable is 0, the position/posture determination unit 1123 determines that there has not been a state in which a predicted worker position is included in the movement range (NO in S303).

Here, when there has not been a state in which a predicted worker position is included in the movement range (NO in S303), the position/posture determination unit 1123 terminates the process.

On the other hand, when there has been a state in which a predicted worker position is included in the movement range (NO in S303), the position/posture determination unit 1123 causes the warning sound output device 1400 to output a warning sound (S304). Alternatively, the position/posture determination unit 1123 causes the display device 1300 to output a warning. Accordingly, the danger presentation system 1020 solves a problem of not displaying a characteristic posture or a characteristic position in the view even in a situation that there is possibility of a collision.

The position/posture determination unit 1123 determines that the movement position is included in the view area when at least a predetermined number of points satisfy the two conditions in the process (S302) of determining whether or not the movement area is included in the view area. However, the position/posture determination unit 1123 may determine that the movement position is included in the view area when the ratio of the number of points satisfying the two conditions with respect to the number of points satisfying the second condition is a predetermined ratio or more.

Accordingly, for example, even in the case where the area included in the view area is small because a worker is at a place near the end of a room, and is looking in the direction to the end, the danger presentation system 1020 can present the characteristic position or the characteristic posture.

The predetermined number used for determination in the process (S302) of determining whether or not the movement area is included in the view area may be decided based on the size (area) of the worker.

That is to say, in general, a human tends to be scared of a creature bigger than the human. Therefore, the predetermined number may be determined based on whether or not the size (area) of the robot presented in the view is greater than the size of the worker. The size of the worker may be determined by extracting a human form from an image acquired by a camera or the like. Alternatively, the size of the worker may be given in advance. A human tends to be scared of a creature which is two times or three times bigger than the human. Therefore, the predetermined number may be determined by comparing a fixed multiple of the worker's size with the robot rather than directly comparing the worker's size with the robot.

The value of the predetermined number may be 1. Accordingly, the position/posture determination unit 1123 determines that the movement position is included in the view area when at least a part of the movement area overlaps with the view area.

Figure 18:
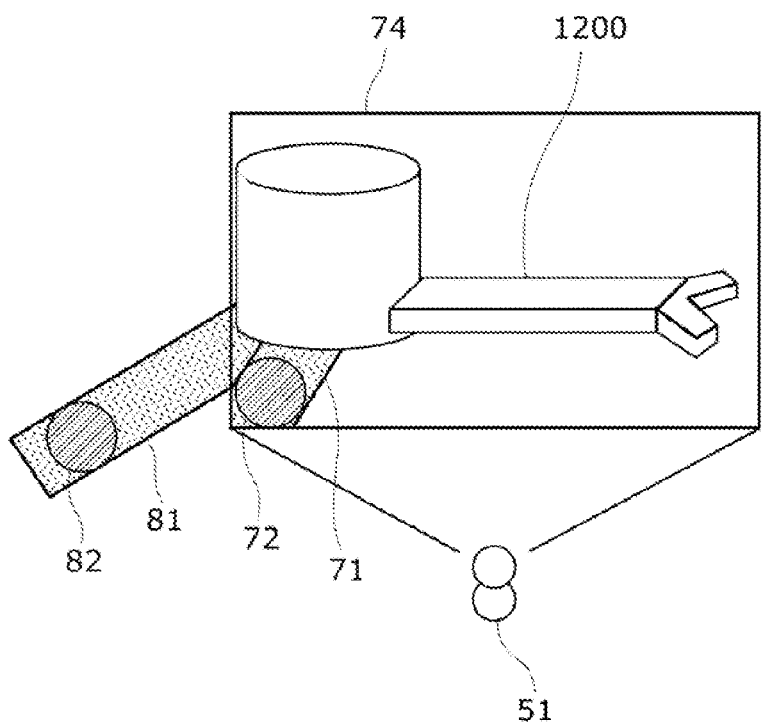
FIG. 18 is a diagram illustrating a characteristic posture and a characteristic position which are presented in a worker's view in Embodiment 3.

FIG. 18 is a diagram illustrating a characteristic posture and a characteristic position which are presented in a worker's view in Embodiment 3.

The robot 1200 is in the view 74. Accordingly, the worker 51 can recognize the existence of the robot 1200. However, the worker cannot recognize the direction in which the robot 1200 is approaching. In the case of the example illustrated in FIG. 18, the robot 1200 rotates counter clockwise based on a motion planning and approaches the worker 51 from the left of the worker 51.

At this moment, the worker 51 cannot recognize a danger appropriately even when the danger presentation system 1020 presents the image of the characteristic posture 81 and the characteristic position 82 that are not completely in the view 74. For this reason, the danger presentation system 1020 presents the image of the characteristic posture 71 and the characteristic position 72 that are completely in the view 74.

The case has been illustrated where the danger area generation unit 1101 determines the range of the dangerous area 31 using all the planning held by the motion planning unit 1201, however, a configuration is desirably made such that the dangerous area 31 is generated based on the motion planning in the range until the robot 1200 reaches the characteristic posture 71 (or the characteristic position 72).

For example, when the robot 1200 illustrated in FIG. 18 rotates 360 degrees, the dangerous area 31 is an area where the robot 1200 moves during one rotation. Therefore, even when the characteristic posture 71 is presented, it is not easy to recognize whether the robot 1200 is approaching clockwise or counterclockwise. However, when the dangerous area 31 is generated as the area where the robot 1200 moves until the robot 1200 reaches the characteristic posture 71, it is clear to recognize in which direction the robot 1200 is approaching.

The danger presentation system 1020 may have a configuration in which an animation is dynamically displayed by switched between a plurality of characteristic postures instead of continuing to present the characteristic posture 71. For example, the danger presentation system 1020 may display the characteristic posture 81, as the first display, which is the first posture that starts to appear in the view, and may display the characteristic posture 71, as the last display, which is a posture that is sufficiently visible in the view.

The danger presentation system 1020 may present an animation including the postures between the above-mentioned first display and the above-mentioned last display. With such a configuration, it is much easier to recognize that the robot 1200 is approaching counter clockwise.

When an animation is presented based on the planning held by the motion planning unit 1201 instead of using the above configuration, there may be a case where the animation is started before the robot 1200 appears in the view of the worker 51, and is not ended even after the robot 1200 disappears from the view of the worker 51.

On the other hand, in the present configuration, the start and end times of the animation are determined based on the time when the robot 1200 starts to appear in the view as well as the time when the robot 1200 is sufficiently visible in the view. Therefore, it is easy for the worker 51 to recognize the animation. Then the worker 51 can easily recognize in which direction the robot 1200 is approaching. The danger presentation system 1020 may continue to present the characteristic posture 71 after the end of the animation, or may return to the start of the animation to repeat the display.

As described above, the danger presentation system 1020 in Embodiment 3 presents the dangerous area 31 around the robot 1200. The danger presentation system 1020 further presents the image of the movable unit in the characteristic posture 71. By recognizing the dangerous area and the characteristic posture displayed by the dangerous presentation system 1020, the worker 51 can determine in which direction the worker 51 should move to secure safety.

In addition, the danger presentation system 1020 in Embodiment 3 predicts the position of the movable unit 1203 in the time order based on the motion planning. The danger presentation system 1020 presents to the worker 51, as the characteristic position or the characteristic posture, the position and/or posture of the movable unit 1203 at a time when the movable unit 1203 is included in the view area of the worker 51, the time being separately predicted. Accordingly, the characteristic position or the characteristic posture for presentation is presented at the location which is visible from the worker 51. Therefore, this prevents the worker 51 from failing to recognize the characteristic position or the characteristic posture.

In addition, the danger presentation system 1020 continues to estimate the position of the movable unit 1203 in the time order until the characteristic position or the characteristic posture satisfies a predetermined condition. The danger presentation system 1020 then determines a presentation position which satisfies the condition. Accordingly, the danger presentation system 1020 can avoid or reduce the possibility that the characteristic position or the characteristic posture is presented in the corner of the view. Therefore, possibility of overlooking the presented characteristic position or characteristic posture is reduced.

Furthermore, when a characteristic position or a characteristic posture is not found in the view area in spite of a possibility of collision of the worker 51 with the movable unit 1203, the danger presentation system 1020 in Embodiment 3 emits a warning sound. Accordingly, the danger presentation system 1020 can give a warning of a collision with the movable unit 1203 outside the view area to the worker 51.

Embodiment 4

In Embodiments 1 to 3, the danger presentation system for a rotary robot has been shown. When a posture of the rotary robot in the near future is presented as a danger, a worker may not be able to recognize the danger depending on the posture. The danger presentation system with an improved feature regarding this point has been shown.

The danger presentation system according to Embodiment 4 is directed to a mobile robot. When a posture of a mobile robot in the near future is presented as a danger, the presented image of the robot may hide behind a wall depending on the position of the robot. In such a case, a worker cannot recognize the danger. Here, a danger presentation system which can present a danger even in such a case is described.

Figure 19:
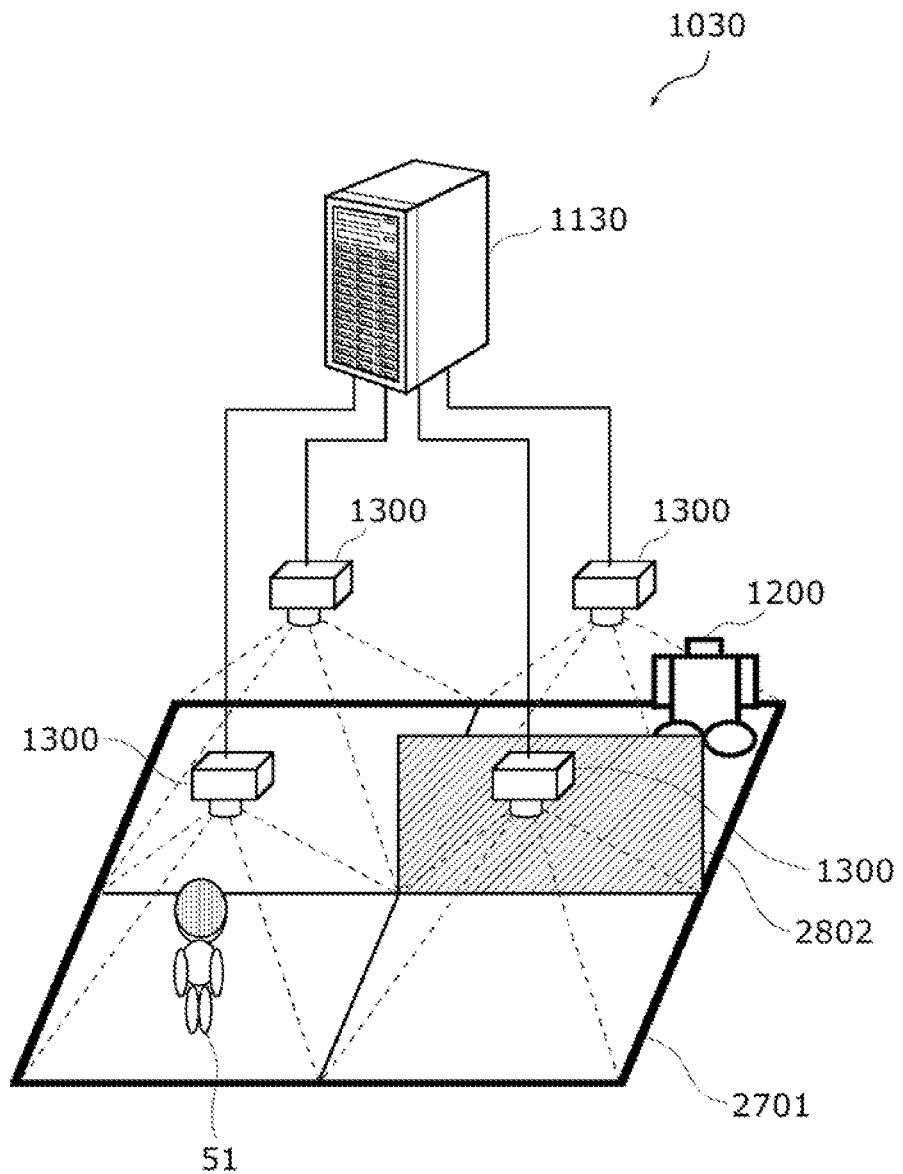
FIG. 19 is a conceptual diagram of a danger presentation system in Embodiment 4.

FIG. 19 is a diagram illustrating a workspace 2701 in Embodiment 4. The danger presentation system 1030 is a device which performs presentation for informing the worker 51 of a danger.

The danger presentation system 1030 includes the robot 1200, a danger presentation device 1130, and the display device 1300. The display device 1300 is a display unit such as a projector which performs display for informing the worker 51 of a danger. The danger presentation device 1130 generates data for displaying danger as an image or the like.

The workspace 2701 includes the worker 51, the robot 1200, and a wall 2802. The positional relationship between the worker 51, the robot 1200, and the wall 2802 in FIG. 19 is an example. The worker 51 may not be able to directly view the robot 1200 depending on the positional relationship.

In such a situation, it is difficult for the worker 51 to perceive a danger of collision with the robot 1200. Thus, it is effective for safety purposes to present a danger to the worker 51 by some method. The danger presentation system 1030 in Embodiment 4 presents a danger to the worker 51 by visually displaying from which direction the robot 1200 appears.

Figure 20:
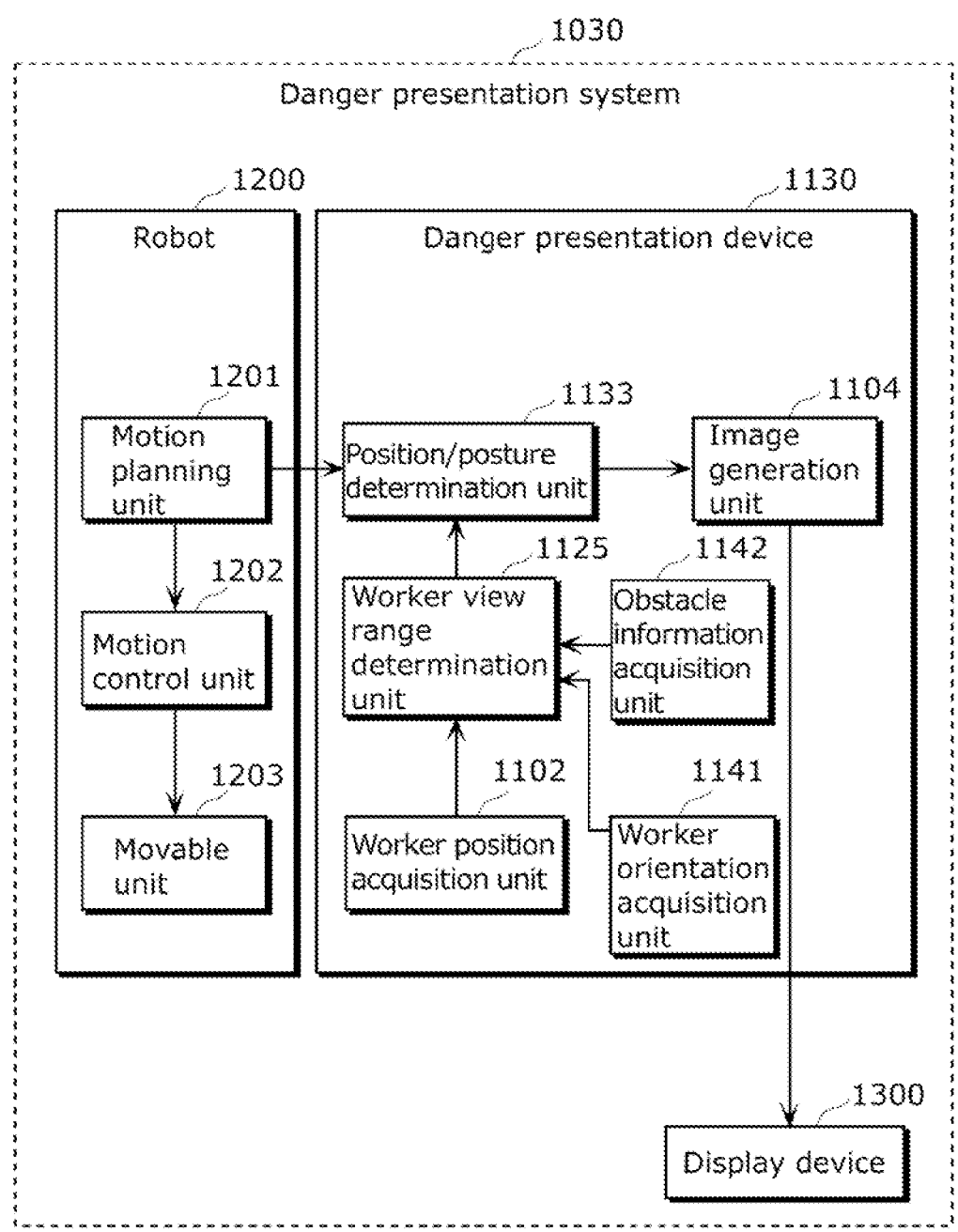
FIG. 20 is a general diagram of the danger presentation system in Embodiment 4.

FIG. 20 is a diagram illustrating the danger presentation system 1030 in Embodiment 4. The danger presentation system 1030 includes the robot 1200, the danger presentation device 1130, and the display device 1300. The robot 1200 in Embodiment 4 is a mobile robot, and includes a motion planning unit 1201, a motion control unit 1202, and a movable unit 1203.

The motion planning unit 1201 plans the near-future position of the robot 1200. Specifically, for example, the motion planning unit 1201 outputs a position P_T at a designated time T (T=0, 1, . . . ). In a simple configuration, the motion planning unit 1201 holds the position P_T of the robot 1200 at time T in a table in advance. The motion planning unit 1201 then refers to the table to output the position P_T of the robot 1200 at the designated time.

Movable portion 1203 is a portion which moves physically in robot 1200. Typically, the movable unit 1203 is a wheel or a leg. The motion control unit 1202 controls the movable unit 1203. The motion control unit 1202 then moves the robot 1200 based on the motion planning held by the motion planning unit 1201. Specifically, the motion control unit 1202 controls the movable unit 1203 so that the position of the robot 1200 at time T is the position P_T.

The danger presentation device 1130 includes the worker position acquisition unit 1102, a worker orientation acquisition unit 1141, the worker view range determination unit 1125, a position/posture determination unit 1133, the image generation unit 1104, and an obstruction information acquisition unit 1142.

The worker position acquisition unit 1102 is a unit to acquire the position of the worker 51. For example, the worker 51 is equipped with a position sensor in advance, and the worker position acquisition unit 1102 acquires a position from the equipped position sensor.

The worker orientation acquisition unit 1141 acquires the direction in which the worker 51 faces within the motion space of the robot 1200. The worker orientation acquisition unit 1141 determines the orientation of the worker 51 under the assumption that, for example, the worker 51 wears a helmet equipped with a position sensor each in the front and in the back, and the worker 51 looks in the direction of the line joining the two positions acquired by the two sensors.

The obstruction information acquisition unit 1142 is a unit to acquire position information of an obstruction which obstructs the view of the worker 51. Specifically, the obstruction information acquisition unit 1142 acquires the position information of the wall 2802 and the like.

Figure 21:
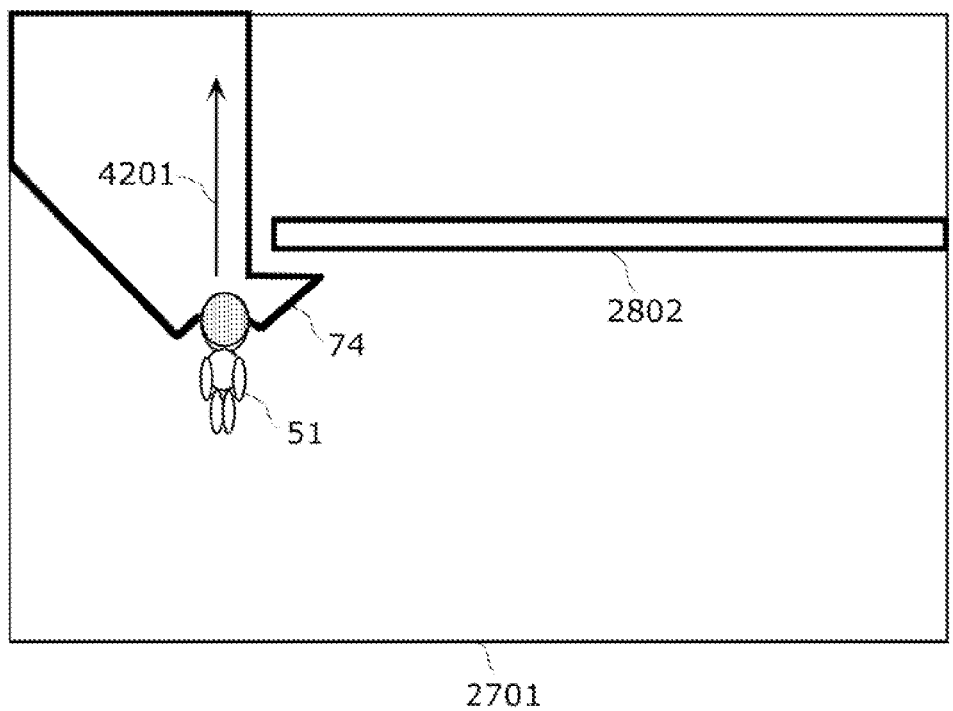
FIG. 21 is a diagram illustrating a view range of a worker in Embodiment 4.

The worker view range determination unit 1125 determines the view range of the worker 51. FIG. 21 is a diagram illustrating the view range of the worker 51.

First, the worker view range determination unit 1125 acquires the position of the worker 51 using the worker position acquisition unit 1102. Next, the worker view range determination unit 1125 acquires the direction in which the worker 51 faces using the worker orientation acquisition unit 1141. In FIG. 21, a worker orientation vector 4201 is a vector which indicates the direction (worker orientation) in which worker 51 faces.

Next, worker view range determination unit 1125 acquires the information of an obstruction in the workspace 2701 from the obstruction information acquisition unit 1142. For example, the position of the wall 2802 in FIG. 21 is acquired by the worker view range determination unit 1125. Next, the worker view range determination unit 1125 determines, as a worker view range 74, a set of point X which is in the workspace 2701 and satisfies the following first to third conditions.

The first condition is that the angle formed by the vector connecting the position of the worker 51 and the point X, and the worker orientation vector 4201 is 55 degrees or less. The second condition is that there is no obstruction such as the wall 2802 on the line segment connecting the position of the worker 51 and the point X. The third condition is that the distance between the position of the worker 51 and the point X is 25 cm or more.

The worker view range 74 illustrated in FIG. 21 is an example of the worker view range which satisfies the above-described conditions. The first condition indicates that the range with the central angle of 55 degrees to the right and left centered on the front of the worker 51 is included in the worker view range 74. The second condition indicates that the space obstructed by the wall 2802 is not included in the worker view range 74. The third condition indicates that an area very near the worker 51 such as the foot area of the worker 51 is not included in the worker view range 74.

Here, the worker view range 74 is defined as the range with the central angle of 55 degrees to the right and left centered on the front of the worker 51, however, this is an example, and the worker view range 74 may be a range with the central angle of other than 55 degrees to the right and left. The narrower the worker view range 74 is, the easier for the worker 51 to recognize the range. The central angle may be changed depending on the movement speed of the worker 51.

For example, when the worker 51 is moving slower than a predetermined speed, the worker view range 74 may be defined with 55 degree angle, while when the worker 51 is moving faster than the predetermined speed, the worker view range 74 may be defined with 30 degree angle. By using such a configuration, even when the worker 51 is moving quickly with less attention to the surroundings, the worker 51 cannot easily overlook an object. On the other hand, when the worker 51 is moving slowly, an object is presented at a position, presentation at which would not interfere with the view of the worker 51.

Here, the area which is apart from the worker 51 by a distance of 25 cm or more, is considered to be the worker view range 74. However, the distance of 25 cm is an example and may be another distance. The longer the distance from the worker 51, the easier for worker 51 to find the worker view range 74. The distance may be changed depending on the movement speed of the worker 51.

For example, when the worker 51 is moving slower than the predetermined speed, the worker view range 74 may be apart from the worker 51 by 25 cm, while when the worker 51 is moving faster than the predetermined speed, the worker view range 74 may be apart from the worker 51 by 50 cm. With such a configuration, even when the worker 51 is moving quickly with less attention to the surroundings, the worker 51 cannot easily overlook an object. On the other hand, when the worker 51 is moving slowly, an object is presented at a position, presentation at which would not interfere with the view of the worker 51.

Here, the worker view range determination unit 1125 determines the worker view range 74 using the position of the worker, the orientation of the worker, and information of obstruction. However, the worker view range determination unit 1125 may estimate the worker view range 74 using any one of the above factors.

The position/posture determination unit 1133 determines the position of the image of the robot 1200 displayed on the workspace 2701 in order to inform the worker 51 of approach of the robot 1200. The details are described later.

The image generation unit 1104 generates an image of the robot 1200 displayed on the workspace 2701 in order to inform the worker 51 of approach of the robot 1200. The image generation unit 1104 also determines a display format of the robot 1200 to be displayed in order to inform the worker 51 of approach of the robot 1200. The process of determining a display format may be performed by a display format determination unit, which is not shown. The detail of the display format determination process performed by the image generation unit 1104 is described later.

The display device 1300 presents the robot 1200 in the display format determined by the image generation unit 1104 at the position determined by the position/posture determination unit 1133. Specifically, the display device 1300 is a unit such as a projector.

Hereinafter, the problem to be solved by the present embodiment is described. First, it is described that no problem occurs without the presence of the wall 2802. Next, it is described that a problem occurs with the presence of the wall 2802. Subsequently, a method of preventing a problem from occurring even with the presence of the wall 2802 is described.

First, a case where the position/posture determination unit 1133 simply presents the position of the robot 1200 at a time after a predetermined time interval is described. A case where there is no wall 2802 in the workspace 2701, and a case where there is the wall 2802 in the workspace 2701 are described in this order. First, a summary of the case where there is no wall 2802 is described with reference to FIGS. 22 to 25.

Figure 22:
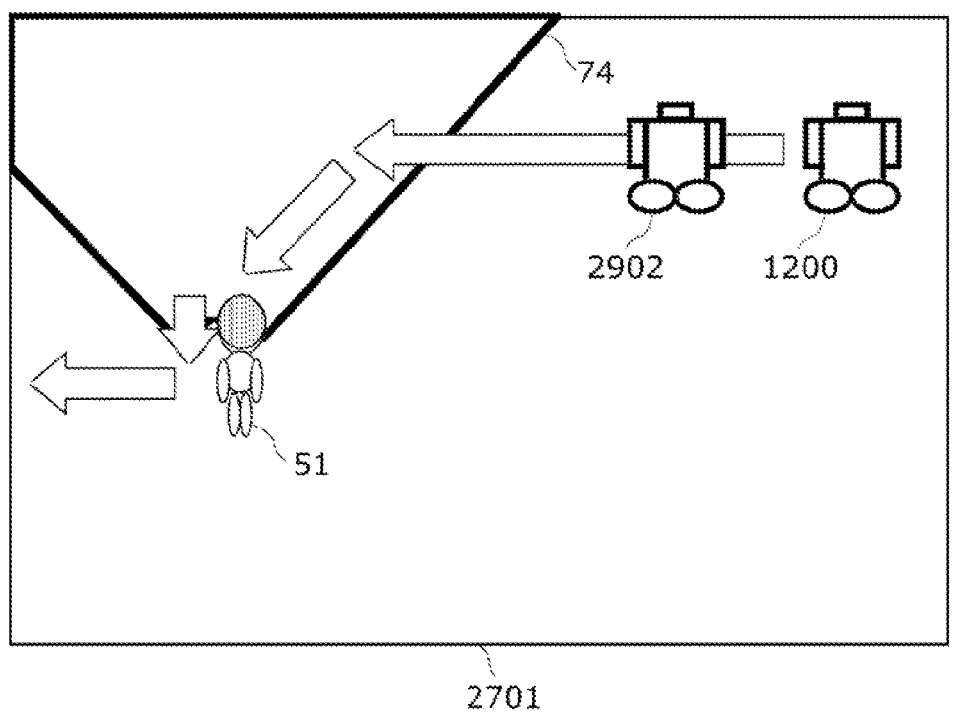
FIG. 22 is a diagram illustrating a state in which there is no wall at time 0.

FIG. 22 is a diagram illustrating the positional relationship between the robot 1200, the worker 51, and an image 2902 of the robot 1200 at time 0. The image 2902 of the robot 1200 is the image at the position of the robot 1200 at the time after the predetermined time from time 0. Here, the predetermined time is assumed to be 2. The image 2902 of the robot 1200 is the image which indicates the position of the robot 1200 at time 2. The arrow in FIG. 22 illustrates the movement path of the robot 1200 after time 0. Such a line is not actually indicated in the workspace.

The movement path includes the place at which the worker 51 is present. Therefore, the robot 1200 comes into contact with the worker 51 unless the worker 51 avoids the contact. Otherwise, the robot 1200 needs to detour or stop in order to avoid the contact. However, detouring or stopping of the robot 1200 reduces the working efficiency of the robot 1200. In order for the worker 51 and the robot 1200 to share the workspace 2701 and work efficiently, it is preferable that the worker 51 grasps the planning of the robot 1200 and determines whether or not the worker 51 should dodge.

The worker view range 74 is a view range of the worker 51 at time 0. The worker view range 74 does not include either of the robot 1200 and the image 2902 of the robot 1200. Therefore, the worker 51 cannot predict approach of the robot 1200.

Figure 23:
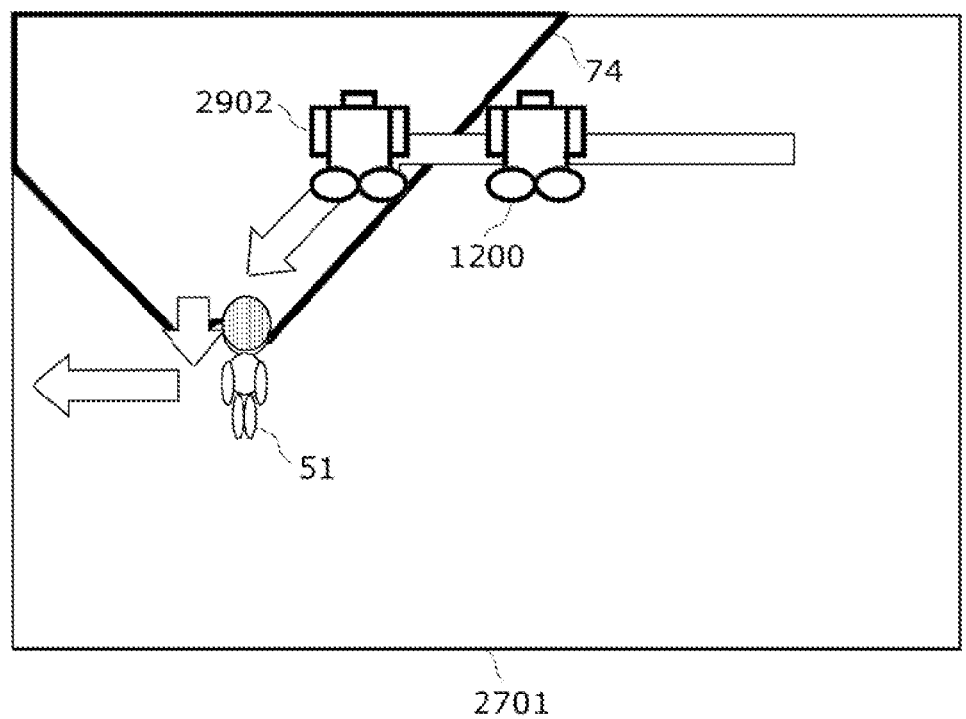
FIG. 23 is a diagram illustrating a state in which there is no wall at time 4.

FIG. 23 is a diagram illustrating the positional relationship between the robot 1200, the worker 51, and the image 2902 of the robot 1200 at time 4. The image 2902 of the robot 1200 is the image which indicates the position of the robot 1200 after a predetermined time from time 4 (i.e., at time 6). The worker view range 74 is the view range of the worker 51 at time 4. The worker view range 74 includes the image 2902 of the robot 1200. Therefore, the worker 51 can predict the approach of the robot 1200. That is to say, the worker 51 can start to prepare for avoidance action such as dodging back.

Figure 24:
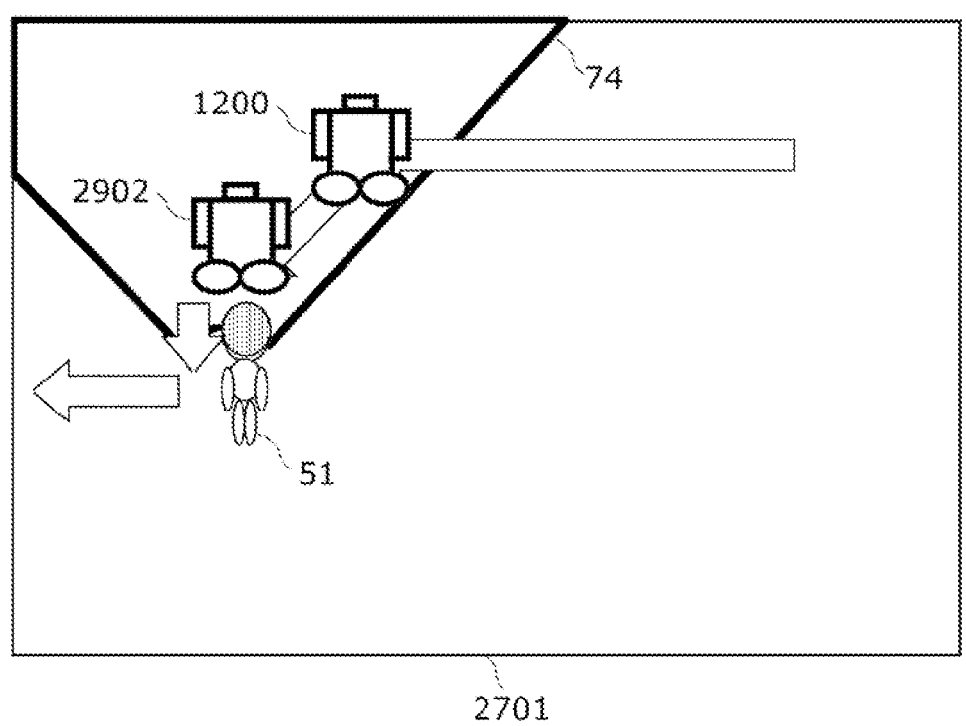
FIG. 24 is a diagram illustrating a state in which there is no wall at time 6.

FIG. 24 is a diagram illustrating the positional relationship between the robot 1200, the worker 51, and the image 2902 of the robot 1200 at time 6. The image 2902 of the robot 1200 is the image which indicates the position of the robot 1200 after a predetermined time from time 6 (i.e., at time 8). The worker view range 74 is the view range of the worker 51 at time 6. The worker view range 74 includes the robot 1200 and the image 2902 of the robot 1200. The worker 51 has already started to prepare for avoidance at the time of FIG. 23. That is to say, the worker 51 can start actual movement at the time. Thus, the worker 51 starts to move at the time.

Figure 25:
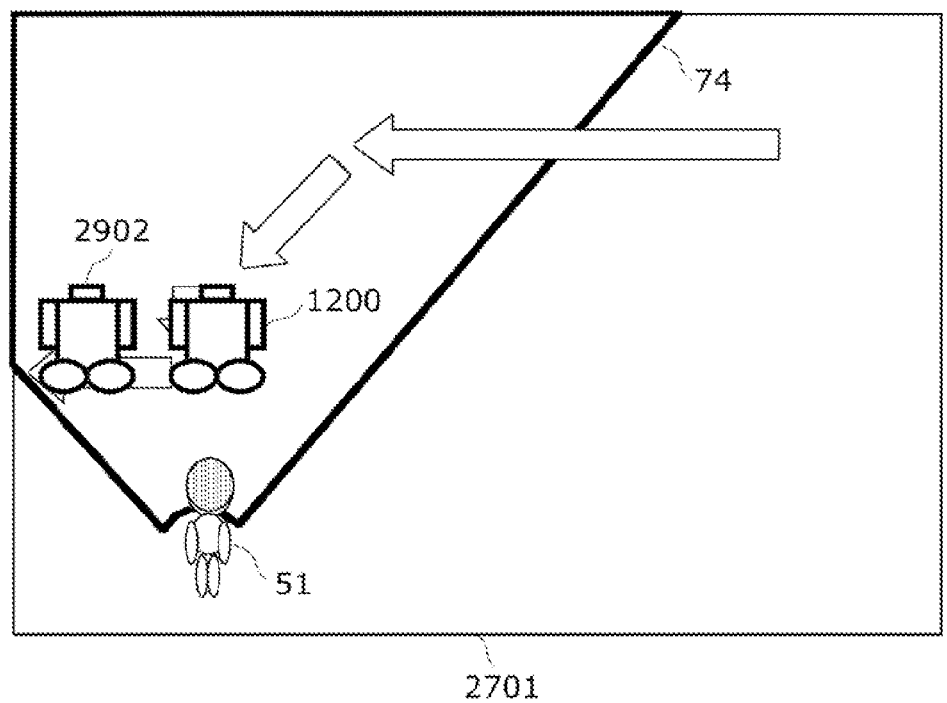
FIG. 25 is a diagram illustrating a state in which there is no wall at time 8.

FIG. 25 is a diagram illustrating the positional relationship between the robot 1200, the worker 51, and the image 2902 of the robot 1200 at time 8. The image 2902 of the robot 1200 is the image which indicates the position of the robot 1200 after a predetermined time from time 8 (i.e., at time 10). The worker view range 74 is the view range of the worker 51 at time 6. The worker view range 74 includes the robot 1200 and the image 2902 of the robot 1200. The position of the robot 1200 at time 8 is almost same as the position at which the worker 51 is at time 0. However, collision can be avoided because the worker 51 has already started to avoid collision.

As described above, the worker 51 can avoid collision with the robot 1200 by presenting the image 2902 of the near-future position of the robot 1200. However, there is a possibility that the worker 51 cannot avoid collision when there is the wall 2802. This is described with reference to FIGS. 26 to 29.

Figure 26:
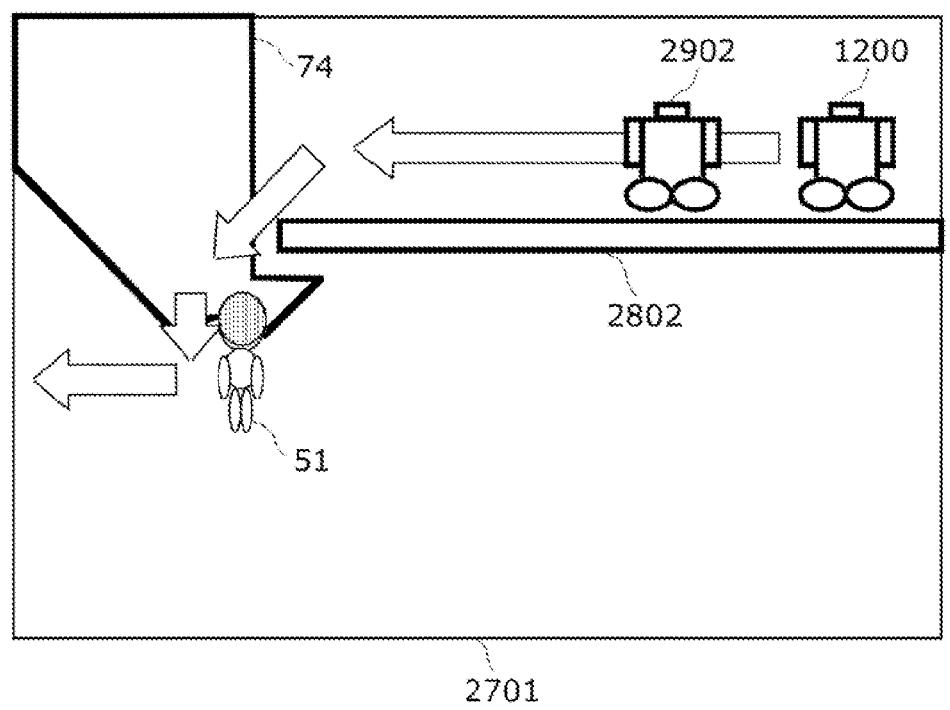
FIG. 26 is a diagram illustrating a state in which there is a wall at time 0.

FIG. 26 is a diagram illustrating the positional relationship between the robot 1200, the worker 51, and the image 2902 of the robot 1200 at time 0. Similarly to the case of FIG. 22, the worker view range 74 at time 0 does not include either of the robot 1200 and the image 2902 of the robot 1200. Therefore, the worker 51 cannot predict approach of the robot 1200.

Figure 27:
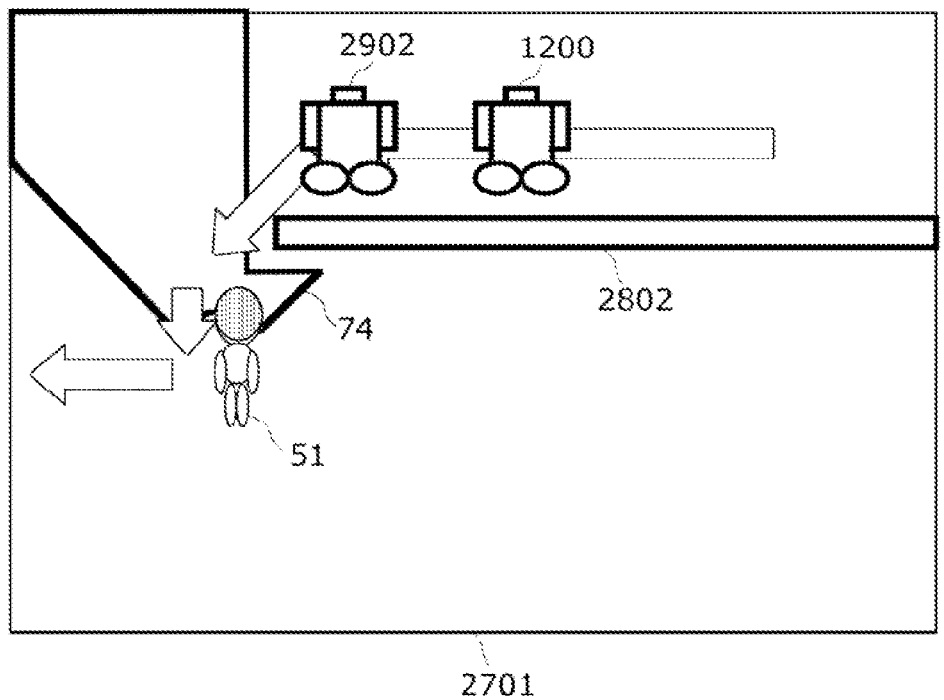
FIG. 27 is a diagram illustrating a state in which there is a wall at time 4.

FIG. 27 is a diagram illustrating the positional relationship between the robot 1200, the worker 51, and the image 2902 of the robot 1200 at time 4. The image 2902 of the robot 1200 is the image which indicates the position of the robot 1200 after a predetermined time from time 4 (i.e., at time 6). The worker view range 74 is the view range of the worker 51 at time 4. The worker view range 74 does not include the image 2902 of the robot 1200. Therefore, the worker 51 cannot predict approach of the robot 1200. Consequently, unlike the case of FIG. 23, the worker 51 cannot start to prepare for avoidance action.

Figure 28:
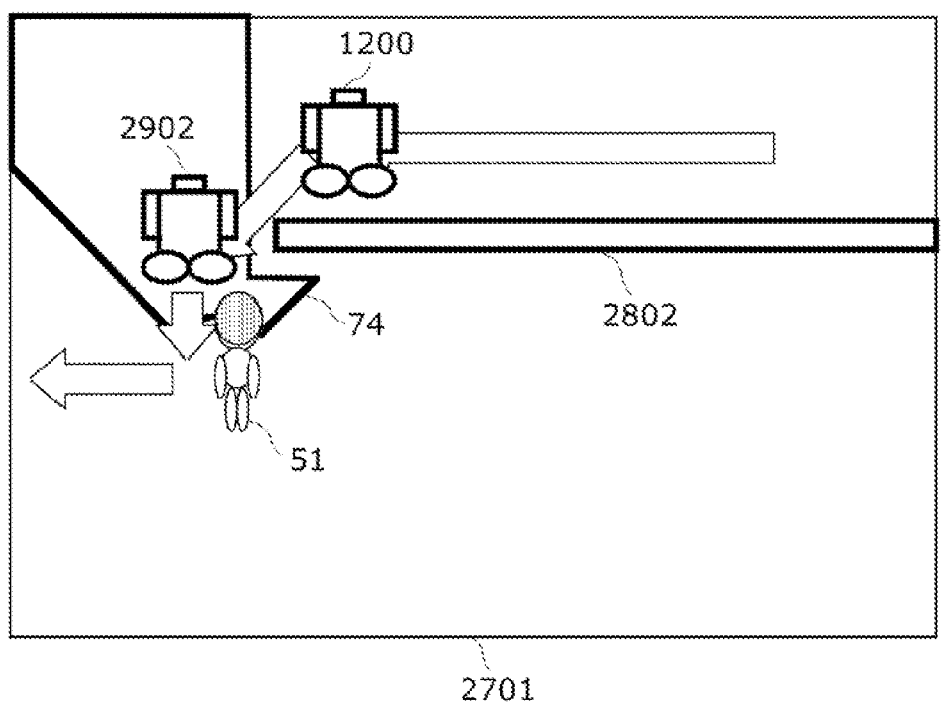
FIG. 28 is a diagram illustrating a state in which there is a wall at time 6.
Figure 29:
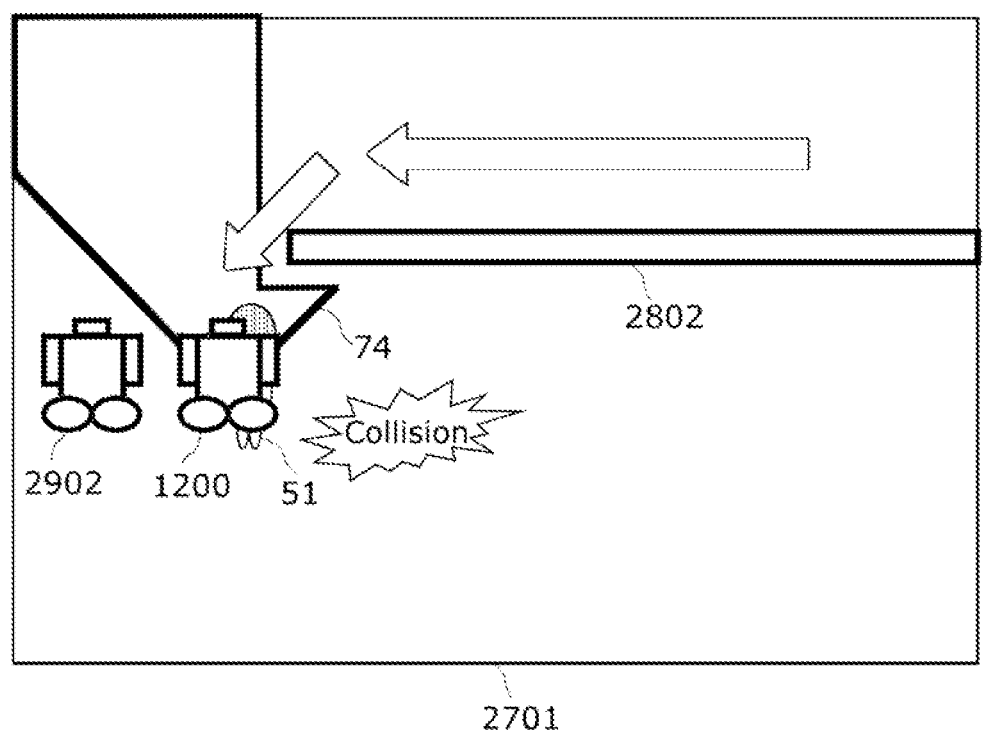
FIG. 29 is a diagram illustrating a state in which there is a wall at time 8.

FIG. 28 is a diagram illustrating the positional relationship between the robot 1200, the worker 51, and the image 2902 of the robot 1200 at time 6. The image 2902 of the robot 1200 is the image which indicates the position of the robot 1200 after a predetermined time from time 6 (i.e., at time 8). At the time, the image 2902 of the robot 1200 is included in the worker view range 74 at last. At the time, the worker 51 starts to prepare for avoidance action.

In the case of FIG. 24, the worker 51 has started to avoid collision, while in the case of FIG. 28, the worker 51 has barely started to prepare for the avoidance at the same time. That is to say, the worker 51 is late in avoiding collision.

FIG. 25 is a diagram illustrating the positional relationship between the robot 1200, the worker 51, and the image 2902 of the robot 1200 at time 8. As a result of the late avoidance, the worker 51 collides with the robot 1200.

As described above, the worker 51 cannot view the presented image 2902 of the robot 1200 because of the wall 2802. Therefore, in some cases, the worker 51 is late in starting an avoidance action, and collides with the robot 1200. Thus, the danger presentation system 1030 in Embodiment 4 determines the position of the image 2902 of the robot 1200 in consideration of the worker view range 74 of the worker 51. The process performed by the danger presentation system 1030 is described with reference to FIG. 30.

First, the position/posture determination unit 1133 issue an instruction (command) to the worker view range determination unit 1125 to acquire the worker view range 74. In response to the received command, the worker view range determination unit 1125 acquires the position of the worker 51 from the worker position acquisition unit 1102 (S2501).

Next, the worker view range determination unit 1125 acquires the orientation of the worker 51 from the worker orientation acquisition unit 1141 (S2502).

Next, the worker view range determination unit 1125 determines the worker view range 74 based on the position of the worker 51 acquired from the worker position acquisition unit 1102, and the orientation of the worker 51 acquired from the worker orientation acquisition unit 1141 (S2503). The detail is similar to that of Embodiment 3. The worker view range determination unit 1125 informs the position/posture determination unit 1133 of the acquired worker view range 74.

Next, the position/posture determination unit 1133 substitutes T0 for a variable T (S2504). The variable T holds a temporary value indicating an offset interval, at the time offset from the current time by the offset interval, the position of the robot 1200 is presented. For example, when the value of the variable T is 2, the image 2902 indicating the robot 1200 is presented at a predicted position of the robot 1200 at the time 2 seconds after the current time. In the following process, the position/posture determination unit 1133 determines the final value of the variable T while changing the value of the variable T. Here, it is assumed that the initial value T0 to be substituted for the variable T is "2."

Next, the position/posture determination unit 1133 acquires the position of the robot 1200 at the time T seconds after the current time, from the motion planning unit 1201 (S2505).

Next, the position/posture determination unit 1133 determines whether or not the position of the robot 1200 time T later is included in the worker view range 74 (S2506). The method of determination is the same as that of Embodiment 3.

In the above step, when the position of the robot 1200 time T later is not included in the worker view range 74 (NO in S2506), the position/posture determination unit 1133 adds 1 to the variable T (S2507). The position/posture determination unit 1133 then acquires the position of the robot 1200 time T later again from the motion planning unit 1201 (S2505). That is to say, when the position of the robot 1200 at time T is not included in the worker view range 74, the position/posture determination unit 1133 increments the time by one unit at a time until the position is included in the worker view range 74.

On the other hand, when the position of the robot 1200 time T later is included in the worker view range 74 (YES in S2506), the position/posture determination unit 1133 determines the position of the robot 1200 time T later as a characteristic position (hereinafter also referred to as a display position). The image generation unit 1104 then determines a display format such as a color, a thickness of outline of the image 2902 of the robot 1200 to be displayed (S2508). The image generation unit 1104 then generates image data of the image 2902 to be displayed at the display position.

Here, by changing the display format of the image 2902 of the robot 1200 by the image generation unit 1104, it becomes easy for the worker 51 to recognize how much time elapses until a collision occurs. The detail is described later.

Finally, the display device 1300 displays the image 2902 of the robot 1200 in the display format determined by the image generation unit 1104 at the position determined by the position/posture determination unit 1133 (S2509).

Figure 30:
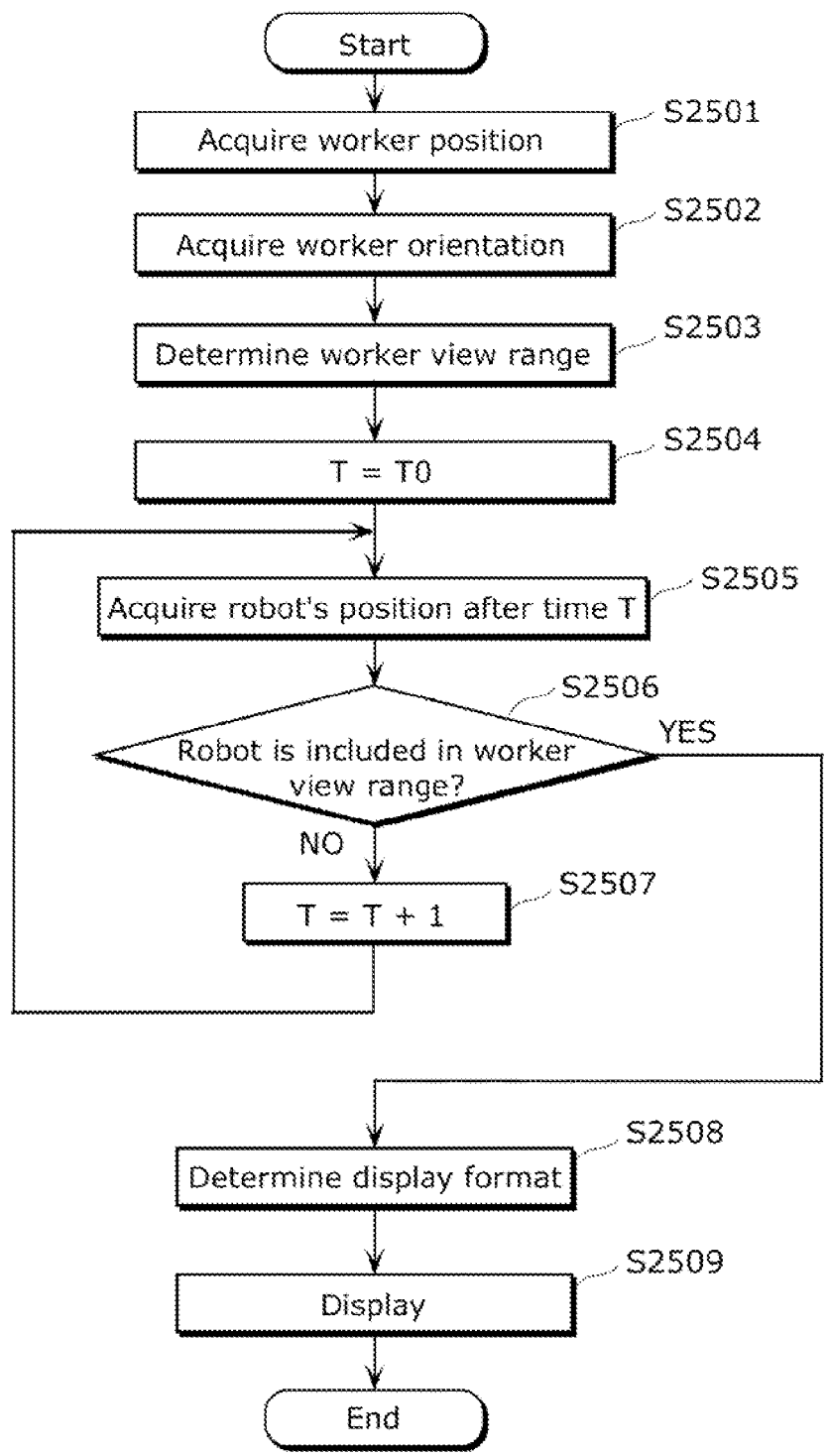
FIG. 30 is a flowchart illustrating the process of the danger presentation system in Embodiment 4.
Figure 31:
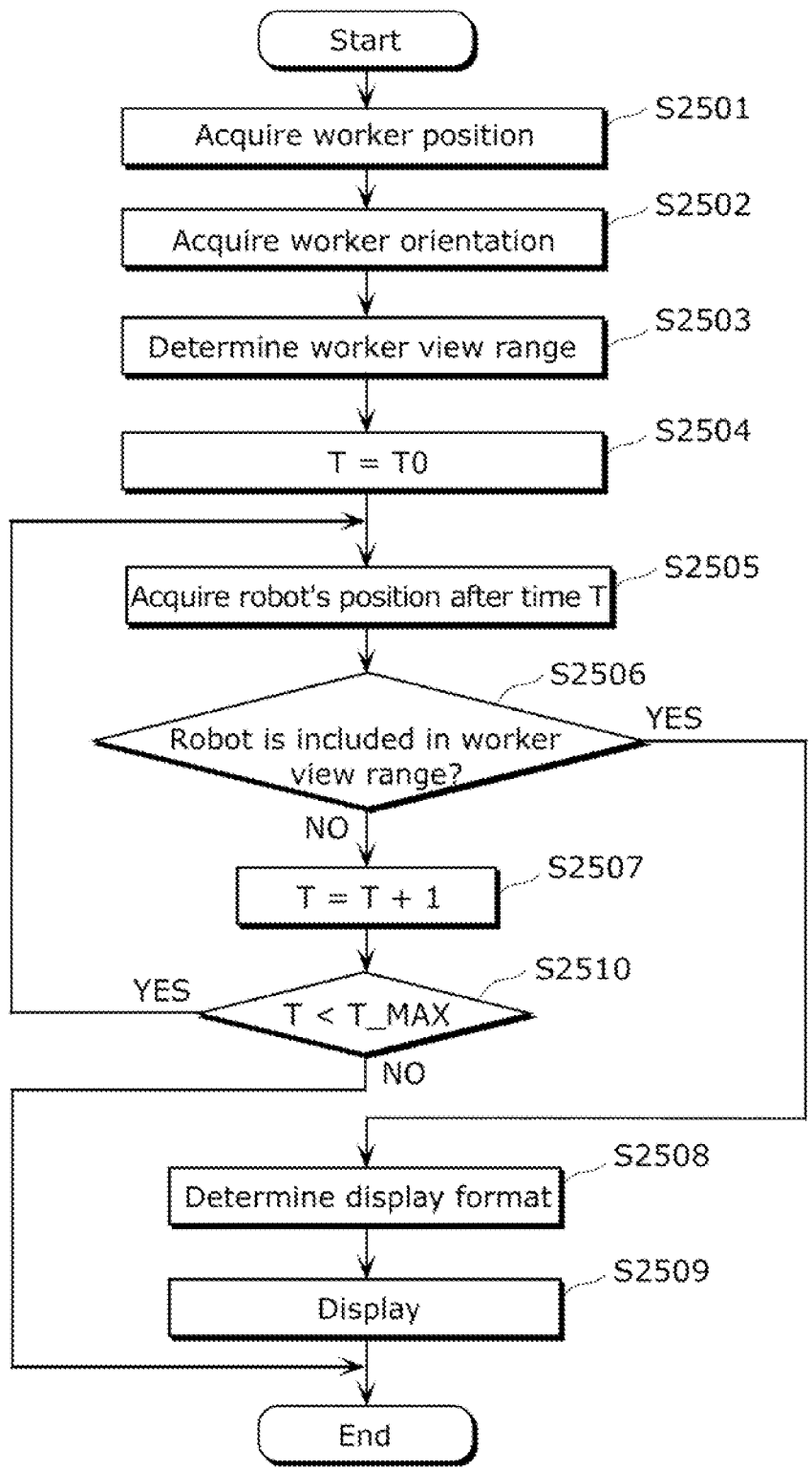
FIG. 31 is a flowchart illustrating a modification of the process of the danger presentation system in Embodiment 4.

FIG. 31 is a flowchart illustrating a modification of the process shown in FIG. 30. In FIG. 31, the position/posture determination unit 1133, after adding 1 to the variable T (S2507), determines whether or not the variable T is less than a maximum T_MAX (S2510).

When the variable T is less than the maximum T_MAX (Yes in S2510), the position/posture determination unit 1133 again acquires the position of the robot 1200 time T later from the motion planning unit 1201 similarly to the process illustrated in FIG. 30 (S2505).

On the other hand, when the variable T is greater than or equal to the maximum T_MAX (No in S2510), the danger presentation system 1030 terminates the process. Accordingly, the image 2902 of the robot 1200 in the distant future is not displayed. That is to say, the image 2902 is not displayed in a state where danger of collision is small.

So far, the danger presentation system 1030 that performs danger presentation one time has been described, however, the danger presentation system 1030 may actually perform danger presentation for a plurality of times with regular time intervals.

Next, the display format determination process performed by the image generation unit 1104 is described. In the danger presentation system 1030, the image 2902 of the robot 1200 presented in the workspace 2701 may be presented at the position of the robot 1200 time T0 later, or at the positions of the robot 1200 time T0+1 later, T0+2 later, ... in some cases. Thus, the worker 51 cannot tell when the robot 1200 is approaching based on the image 2902 of the robot 1200 viewed by the worker 51.

Then, when the time until the robot 1200 reaches the determined display position is short, the image generation unit 1104 determines a display format so that the image 2902 of the robot 1200 is displayed in the display format more conspicuously. On the other hand, when the time until the robot 1200 reaches the determined display position is long, the image generation unit 1104 determines a display format so that the image 2902 of the robot 1200 is displayed in the display format less conspicuously.

For example, when the time until the robot 1200 reaches the display position is short, the image generation unit 1104 sets the brightness of the image 2902 of the robot 1200 to a high value. That is to say, the image generation unit 1104 causes the image 2902 to be displayed brightly. On the other hand, when the time until the robot 1200 reaches the display position is long, the image generation unit 1104 sets the brightness of the image 2902 of the robot 1200 to a low value.

For example, when the time until the robot 1200 reaches the display position is shorter than a predetermined time, the image generation unit 1104 causes the image 2902 to be displayed brightly so as to make the image 2902 more noticeable than in the case where the time until the robot 1200 reaches the display position is longer than or equal to the predetermined time. However, when a room is already bright with a light, the image generation unit 1104 may obstruct light to the image 2902 to cause the image 2902 to be displayed dark so as to make the image 2902 more noticeable.

For example, when the time until the robot 1200 reaches the display position is short, the image generation unit 1104 increases the thickness of the outline of the image 2902 indicating the robot 1200.

On the other hand, when the time until the robot 1200 reaches the display position is long, the image generation unit 1104 decreases the thickness of the outline of the image 2902 indicating the robot 1200.

For example, when the time until the robot 1200 reaches the display position is shorter than a predetermined time, the image generation unit 1104 increases the thickness of the outline of the image 2902 so as to make the image more noticeable than in the case where the time until the robot 1200 reaches the display position is longer than or equal to the predetermined time.

For example, the image generation unit 1104 generates image data around the image 2902 of the robot 1200, the image data presenting a value indicating the time until the robot 1200 reaches the display position.

Figure 32:
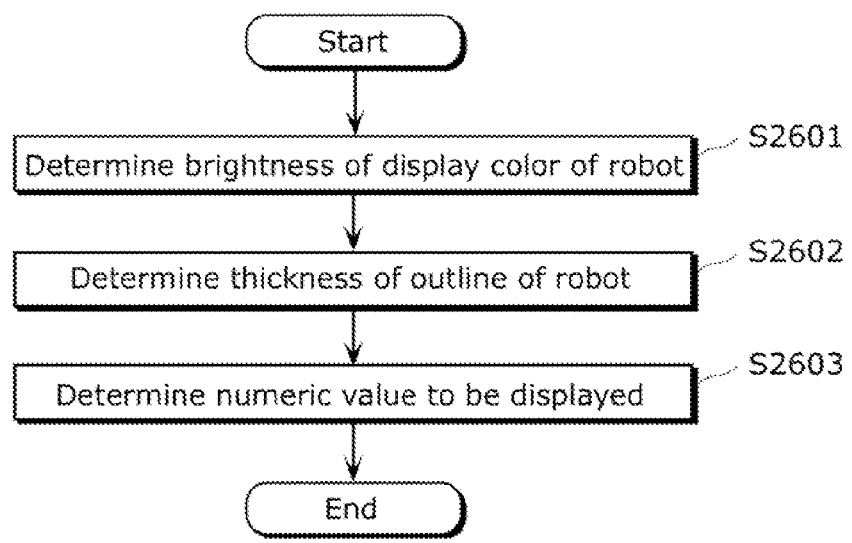
FIG. 32 is a flowchart illustrating a display format determination process in Embodiment 4.

Hereinafter, the flow of the process of the image generation unit 1104 is described with reference to FIG. 32. The following process is an example of the display format determination process (S2508) in the flowchart illustrated in FIG. 30.

First, the image generation unit 1104 determines a display color for the robot (S2601). For example, the image generation unit 1104 calculates a value according to "(maximum brightness)×T0/(value of the variable T)" (Expression 1), and assigns the calculated value to the display color of the robot 1200. Here, for example when it is assumed that brightness of white is "255" and brightness of black is "0", the maximum brightness is "255" (brightness of white).

The value of "T0/(value of the variable T)" (Expression 2) is "1" when the value of the variable T is "T0", and is "½" when the value of variable T is "T0×2." That is to say, when the time until robot 1200 reach the display position is short, the value of Expression 2 is "1", and the longer the time, the smaller the value of Expression 2 than "1." Therefore, when the time until the robot 1200 reaches the display position is short, the image generation unit 1104 sets the brightness of the image 2902 of the robot 1200 to a high value, and when the time is long, sets the brightness to a low value.

Next, the image generation unit 1104 determines a thickness of the outline of the image 2902 of the robot 1200 to be displayed (S2602).

For example, the image generation unit 1104 determines a thickness of the outline based on "5×T0/(value of the variable T)" (Expression 3). The value of Expression 3 is "5" when the value of the variable T is "T0", and is "2.5" when the value of the variable T is "T0×2." That is, when the time until the robot 1200 reaches the display position is short, the value of Expression 3 is "5", and the longer the time, the smaller the value of Expression 3 than "5."

That is to say, when the time until the robot 1200 reaches the display position is short, the image generation unit 1104 increases the thickness of the outline of the image 2902, and when the time is long, decreases the thickness of the outline of the image 2902.

Next, the image generation unit 1104 determines a value of the time until the robot 1200 reaches the display position (S2603). The determined value is presented around the image 2902 of the robot 1200 by the display device 1300. Specifically, the above-mentioned value is the value of the variable T, and indicates the time until the robot 1200 reaches the display position. The image generating unit 1104 truncates the decimal places of the value, or converts the value to the equivalent value in seconds as needed.

The summary of operation using the present technique is described with reference to FIGS. 33 to 36.

Figure 33:
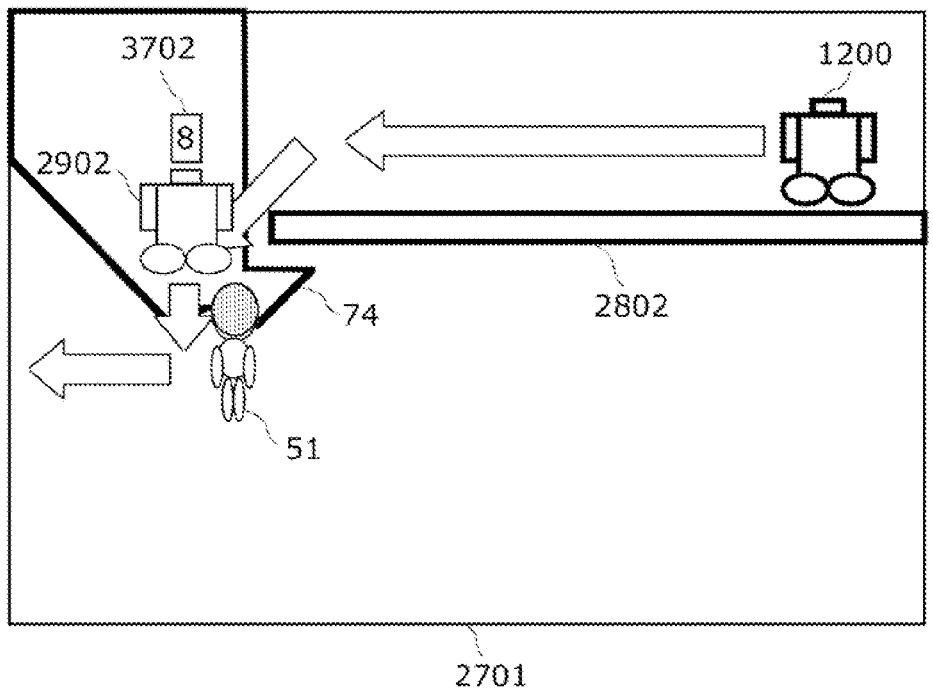
FIG. 33 is a diagram illustrating an improved state at time 0.

FIG. 33 is a diagram illustrating the positional relationship between the robot 1200, the worker 51, and the image 2902 of the robot 1200 at time 0. The image 2902 of the robot 1200 is the image at the position of the robot 1200 at the time after time 8 from time 0. Here, "8" is the time at which the image 2902 of the robot 1200 is included in the worker view range 74 after the predetermined time "2" from the current time. At time 8, a reaching time 3702 to the position is displayed around the robot 1200.

The brightness of the image 2902 of the robot 1200 is "255×2/8" (Expression 1). That is, the brightness is "63.75." The thickness of the outline is "5×2/8" from Expression 3. That is, the thickness of the outline is "1.25."

The worker 51 illustrated in FIG. 33 can recognize that the robot 1200 is approaching from the back of the wall. Although the position where the image 2902 of the robot 1200 is presented is close to the worker 51, the brightness of the image 2902 is low and the outline of the image 2902 is relatively thin. Therefore, the worker 51 can tell that there is still some time before collision, thus the current work can be continued.

Figure 34:
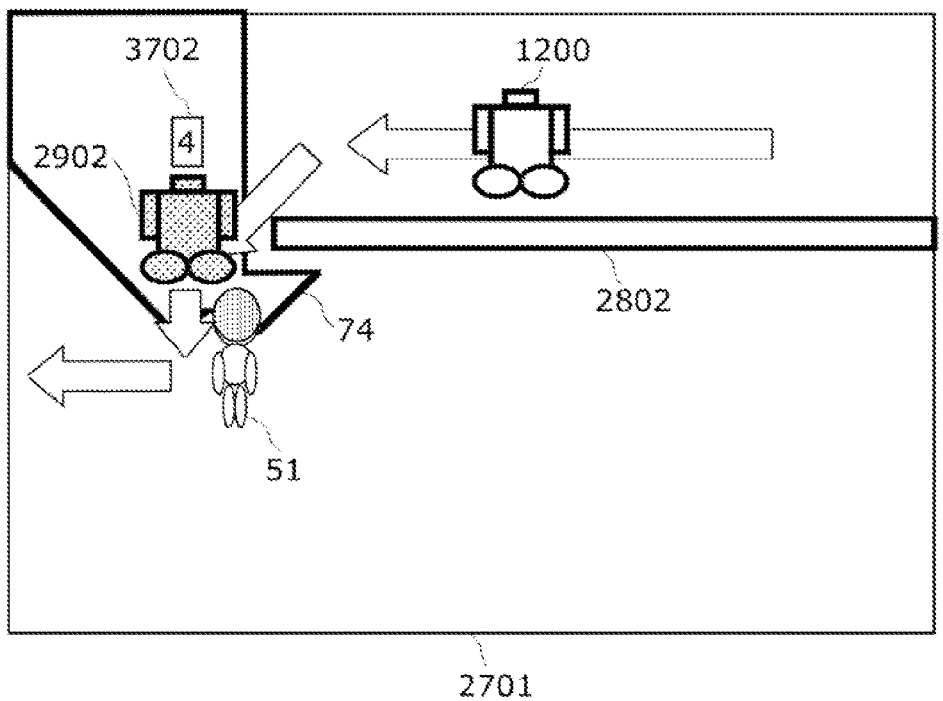
FIG. 34 is a diagram illustrating an improved state at time 4.

FIG. 34 is a diagram illustrating the positional relationship between the robot 1200, the worker 51, and the image 2902 of the robot 1200 at time 4. The image 2902 of the robot 1200 is the image at the position of the robot 1200 at the time after time 4 from time 4. The worker view range 74 is the view range of the worker 51 at time 4. At time 4, the worker 51 can predict the approach of the robot 1200 because the image 2902 of the robot 1200 is included in the worker view range 74.

The brightness of the image 2902 of the robot 1200 is "255×2/4" (Expression 1). That is, the brightness is "127.5." The thickness of the outline is "5×2/4" from Expression 3. That is, the thickness of the outline is "2.5." The worker 51 can recognize that the approach of the robot 1200 is much closer because the image 2902 of the robot 1200 has become brighter and the outline also has become thicker than in FIG. 33. The worker 51 then can start to prepare for the avoidance.

Figure 35:
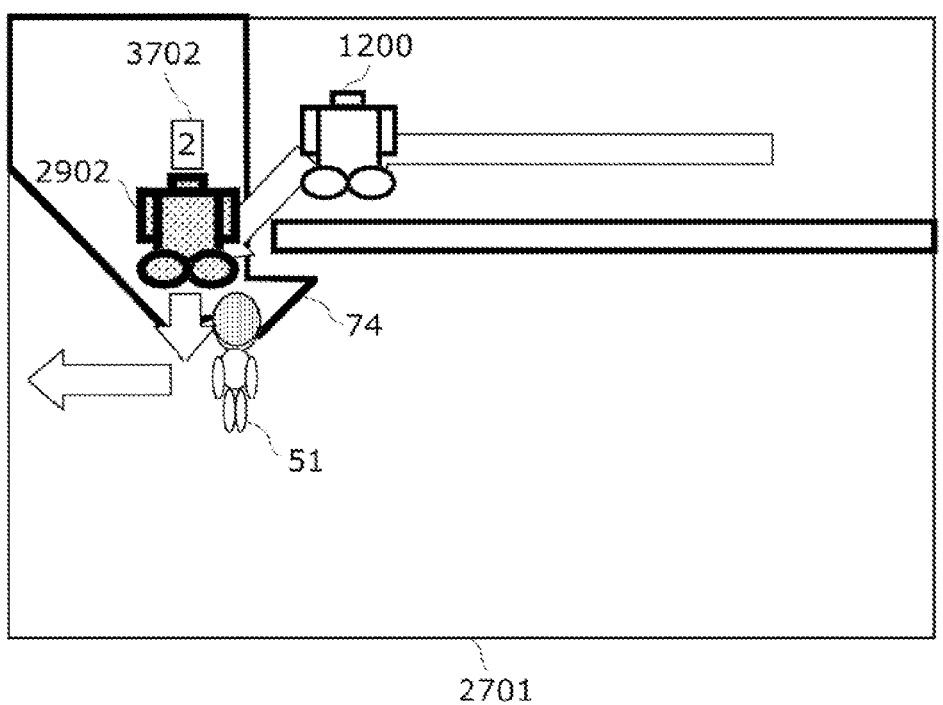
FIG. 35 is a diagram illustrating an improved state at time 6.

FIG. 35 is a diagram illustrating the positional relationship between the robot 1200, the worker 51, and the image 2902 of the robot 1200 at time 6. The image 2902 of the robot 1200 is the image at the position of the robot 1200 at the time after time 2 from time 6. The worker view range 74 is the view range of the worker 51 at time 6. At time 6, the worker view range 74 includes the image 2902 of the robot 1200.

The brightness of the image 2902 of robot 1200 is "255×2/2" (Expression 1). That is, the brightness is "255." The thickness of the outline is "5×2/2" from Expression 3. That is, the thickness of the outline is "5." The worker 51 can recognize that the approach of the robot 1200 is much closer because the image 2902 of the robot 1200 has become brighter and the outline also has become thicker than in FIG. 34. Because the worker 51 starts to prepare for the avoidance at the time of FIG. 34, the worker 51 can start to avoid collision at the time of FIG. 35.

Figure 36:
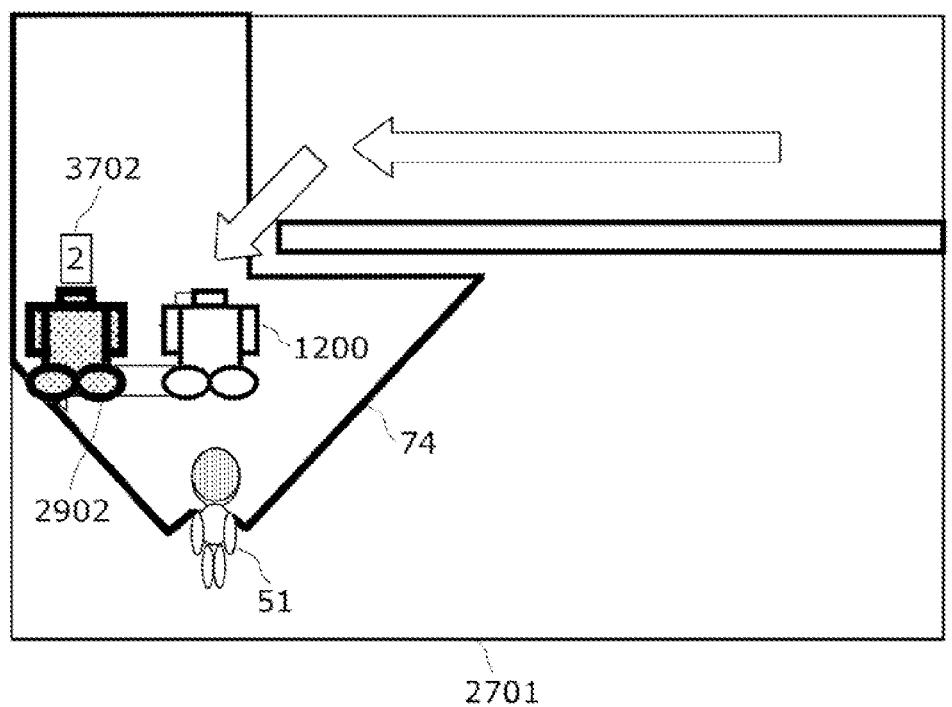
FIG. 36 is a diagram illustrating an improved state at time 8.

FIG. 36 is a diagram illustrating the positional relationship between the robot 1200, the worker 51, and the image 2902 of the robot 1200 at time 8. The image 2902 of the robot 1200 is the image which indicates the position of the robot 1200 after a predetermined time from time 8 (i.e., at time 10). The worker view range 74 is the view range of the worker 51 at time 8, and includes the robot 1200 and the image 2902 of the robot 1200.

The position of the robot 1200 at time 8 is almost same as the position at which the worker 51 is at time 0. However, collision can be avoided because the worker 51 has already started to avoid collision.

Figure 37:
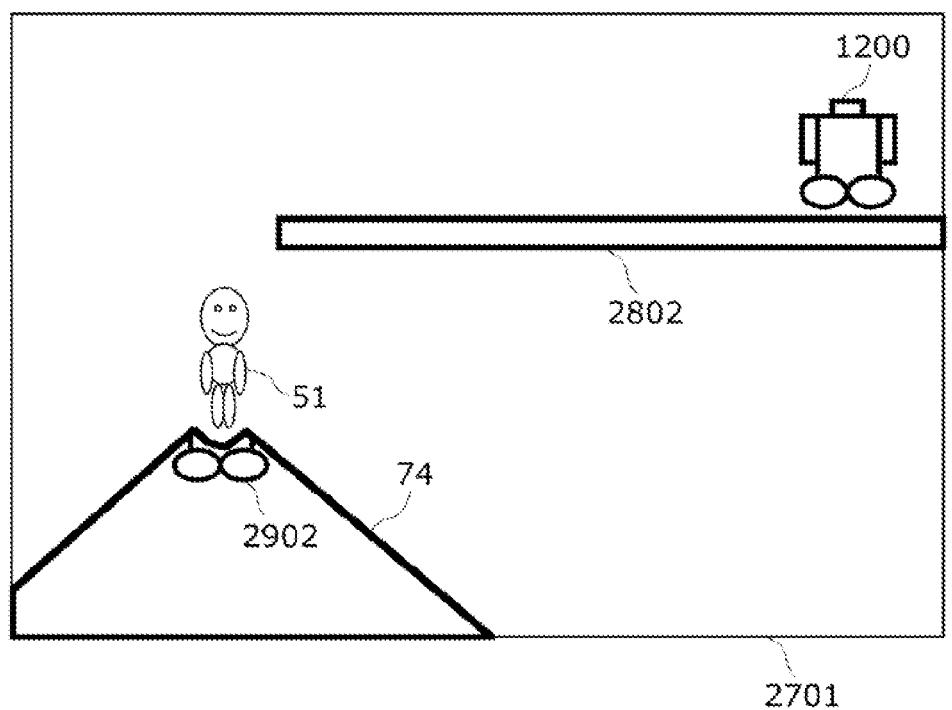
FIG. 37 is a conceptual diagram illustrating an operation in an opposite direction in Embodiment 4.
Figure 38:
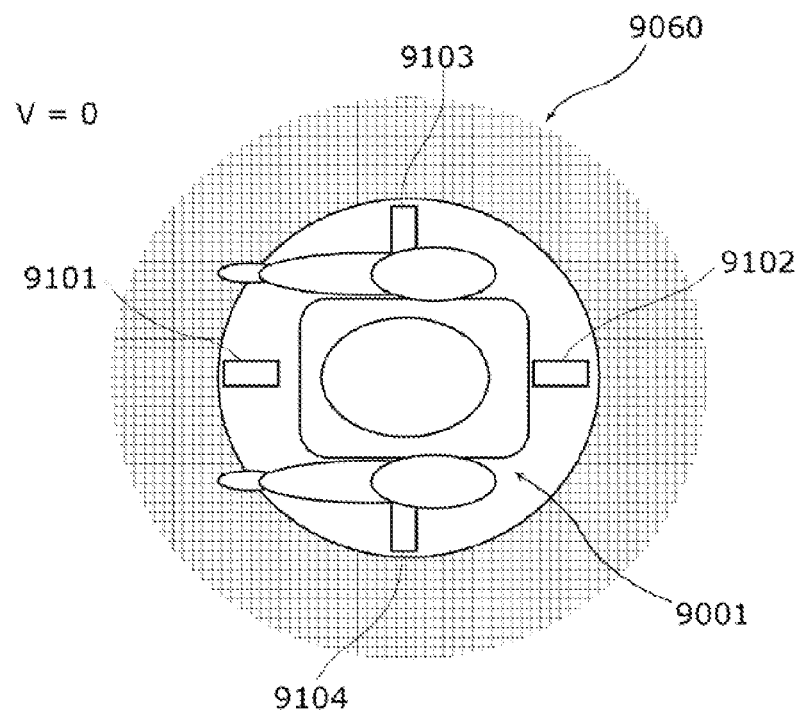
FIG. 38 is a diagram illustrating a dangerous area which is presented when a movable robot is stopped in a conventional technology.
Figure 39:
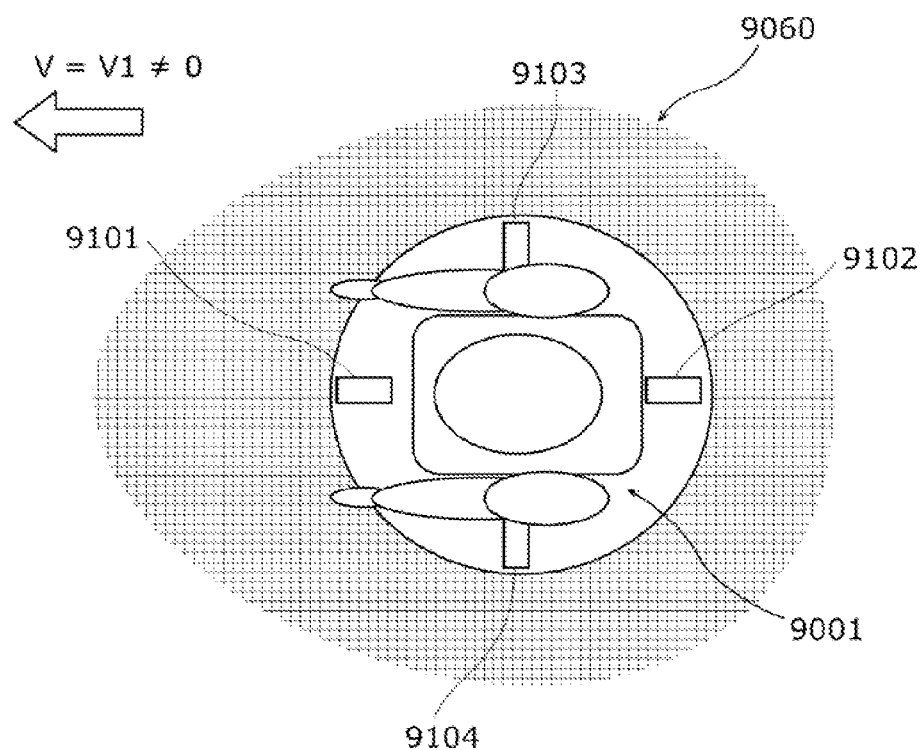
FIG. 39 is a diagram illustrating a dangerous area which is presented when a movable robot is in motion in a conventional technology.
Figure 40:
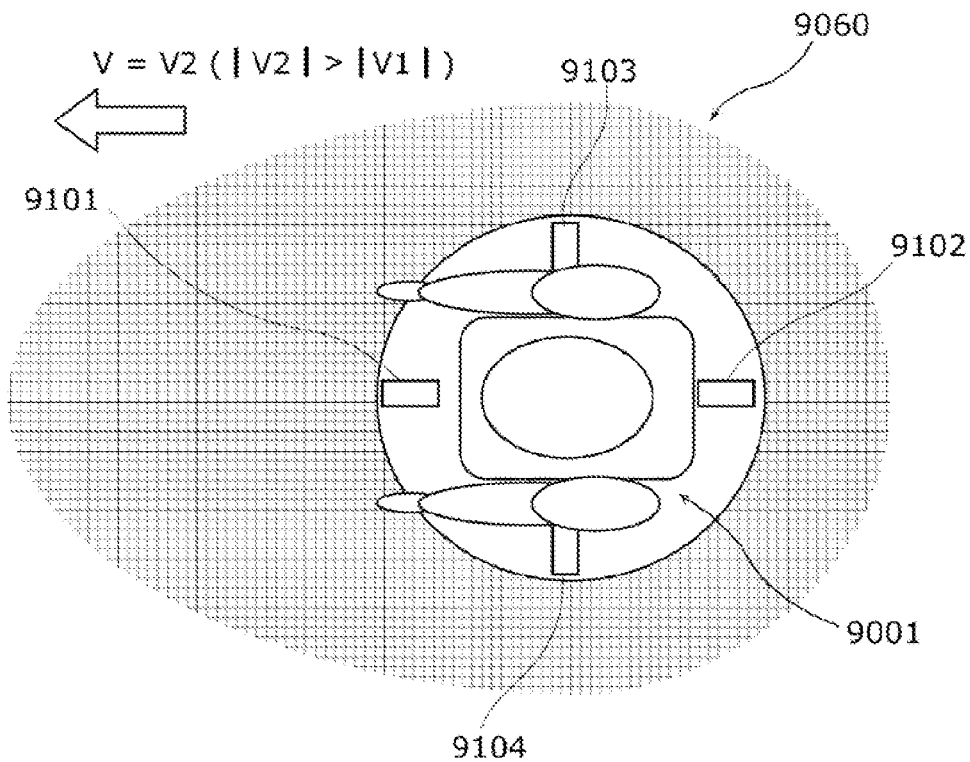
FIG. 40 is a diagram illustrating a dangerous area which is presented when a movable robot is in quick motion in a conventional technology.
Figure 41:
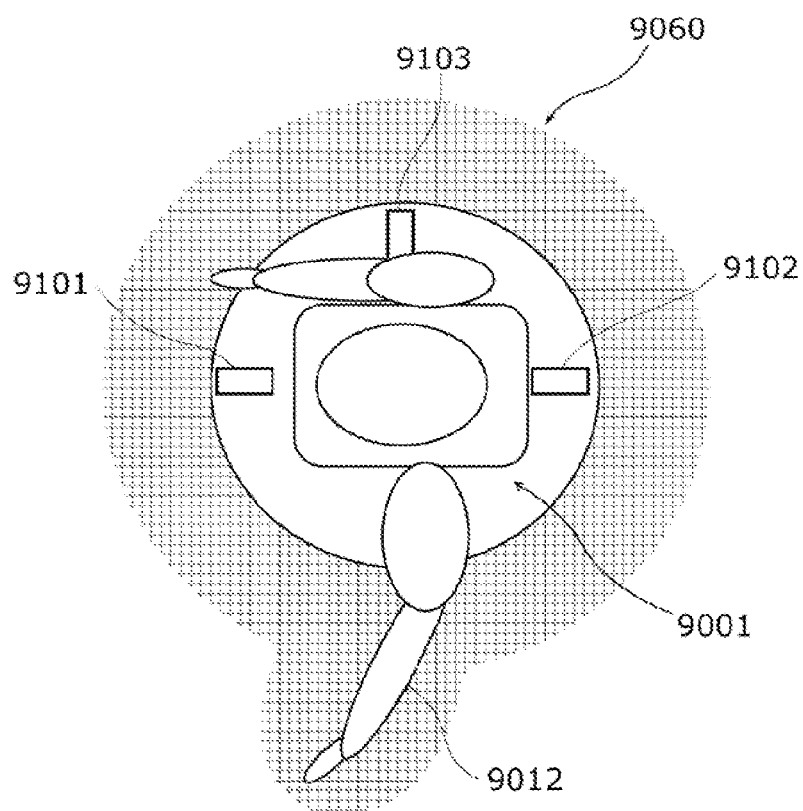
FIG. 41 is a diagram illustrating a dangerous area which is presented when a movable robot moves its arm in a conventional technology.
Figure 42:
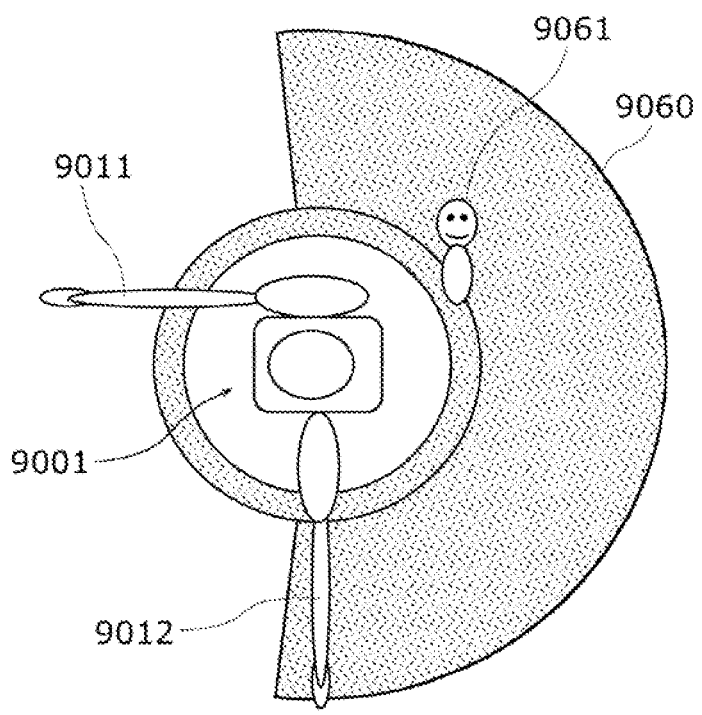
FIG. 42 is a diagram illustrating a problem in a conventional technology.

FIG. 37 is a diagram illustrating a state where the worker 51 faces away from the direction of the robot 1200 approaching the worker 51. In FIG. 37, the image 2902 of the robot 1200 is presented at the place of the worker 51. In this case, the worker 51 receives light for displaying the image 2902. In the case where the worker 51 knows that light receiving indicates a danger, the worker 51 can recognize the danger.

As the robot 1200 approaches the worker 51, the brightness is increased, and the worker 51 receives brighter light. Therefore, the worker 51 can recognize that a danger is approaching from a difference in the brightness. In this manner, the danger presentation system 1030 can inform the worker 51 of a danger without depending on a warning sound or the like.

As described above, the danger presentation system 1030 in Embodiment 4 presents the near-future image 2902 of the robot 1200 in the worker view range 74. Therefore, the danger presentation system 1030 can appropriately present a dangerous situation. In Embodiment 4, the characteristic position of a mobile robot is presented, however, the characteristic posture of a rotary robot may be presented.

As shown in a plurality of embodiments in the above, the danger presentation system according to an aspect of the present invention appropriately presents a dangerous situation around a robot. In addition, the danger presentation device according to an aspect of the present invention can generate data for appropriately presenting a dangerous situation around a robot. The generated data is displayed as an image of the robot by a display device. Accordingly, a worker can appropriately recognize the danger situation around the robot.

These embodiments are only examples, and the present invention is not limited to these embodiments. The embodiments obtained by making various modifications, which occur to those skilled in the art, to the present embodiments, and other embodiments which are achieved by arbitrarily combining the components of these embodiments are also capable of generating data for appropriately presenting a dangerous situation, and thus are included in the scope of the present invention.

The present invention can be implemented not only as a danger presentation device, but also as a method including the steps performed by the processing units constituting the danger presentation device. The steps of the method are typically executed by a computer. The present invention can be achieved as a program which causes a computer to execute the steps of the method. Furthermore, the present invention can be achieved as a computer-readable storage medium such as a CD-ROM in which the program is stored. Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The danger presentation device according to an aspect of the present invention can generate data for appropriately presenting a dangerous situation accompanied by a motion of a robot, and can be utilized, particularly in a production site or the like where workers work near a robot.

What is claimed is:

1. A danger presentation device comprising:
a worker position acquisition unit configured to acquire a worker position which is a position of a worker;
a worker view range determination unit configured to determine a view range of the worker depending on the worker position acquired by said worker position acquisition unit;
a position/posture determination unit configured to identify a specific time in which at least a part of a robot which operates according to a motion planning is included in the view range, and to determine a position/posture which contains at least one of a position of the robot at the specific time and a posture of the robot at the specific time; and
an image generation unit configured to generate image data for illustrating the position/posture determined by said position/posture determination unit.

2. The danger presentation device according to claim 1, further comprising
a dangerous area generation unit configured to generate a dangerous area according to the motion planning, the dangerous area being covered by movement of the robot,
wherein said position/posture determination unit is configured to determine the position/posture at the specific time in a time period including a predicted time of a collision between the worker and the robot, based on the worker position and the motion planning, and
said image generation unit is configured to generate the image data for illustrating the dangerous area and the position/posture determined by said position/posture determination unit.

3. The danger presentation device according to claim 2, wherein said position/posture determination unit is configured to determine the position/posture at the specific time which is a time before the predicted time of the collision.

4. The danger presentation device according to claim 2, wherein said position/posture determination unit is configured to determine the position/posture at the specific time in which a distance between the worker position and a moving position of the robot is greater than or equal to a predetermined distance, the specific time being before the predicted time of the collision and closest to the predicted time of the collision.

5. The danger presentation device according to claim 2, wherein said position/posture determination unit is configured to predict a position of the worker after an elapse of a predetermined time, as the worker position, based on the worker position acquired by said worker position acquisition unit, to predict the collision between the worker and the robot based on the predicted worker position and the motion planning, and to determine the position/posture at the specific time in a time period including the predicted time of the collision.

6. The danger presentation device according to claim 5, wherein said position/posture determination unit is configured to determine the position/posture at the specific time which is the predicted time of the collision.

7. The danger presentation device according to claim 1, wherein said position/posture determination unit is configured to determine the position/posture at the specific time in which a motion range covered by movement of the robot according to the motion planning during a predetermined time has an overlapping intersection with the view range with the overlapping intersection greater than or equal to a predetermined size, the specific time being after a predicted time of a first collision between the worker and the robot, and the specific time being closest to the predicted time of the first collision.

8. The danger presentation device according to claim 1, wherein in a case where a collision between the worker and the robot is predicted, and there is no time applicable to the specific time, said position/posture determination unit is configured to cause a warning device to output a warning.

9. The danger presentation device according to claim 1, wherein in a case where the specific time is at or after a time at which the robot passes through the worker position which is acquired by said worker position acquisition unit, said position/posture determination unit is configured to cause a warning device to output a warning.

10. The danger presentation device according to claim 9, wherein in a case where the specific time is before a time at which the robot passes through the worker position which is acquired by said worker position acquisition unit, said image generation unit is configured to generate the image data.

11. The danger presentation device according to claim 1, further comprising:
a worker orientation acquisition unit configured to acquire a worker orientation which is an orientation of a worker; and
an obstruction information acquisition unit configured to acquire obstruction information which is information of an obstruction that obstructs the view range,
wherein said worker view range determination unit is configured to determine the view range depending on the worker position acquired by said worker position acquisition unit, the worker orientation acquired by said worker orientation acquisition unit, and the obstruction information acquired by said obstruction information acquisition unit.

12. The danger presentation device according to claim 1, wherein said image generation unit is configured to generate the image data for illustrating the position/posture and a reaching time between a current time and the specific time.

13. The danger presentation device according to claim 1, wherein said image generation unit is configured to determine a display format for the position/posture depending on a reaching time between a current time and the specific time, and to generate the image data for illustrating the position/posture in the determined display format.

14. The danger presentation device according to claim 13, wherein said image generation unit is configured to determine the display format so that a brightness when the reaching time is a first time is higher than a brightness when the reaching time is a second time which is longer than the first time, and to generate the image data for illustrating the position/posture in the determined display format.

15. The danger presentation device according to claim 1, wherein said position/posture determination unit is configured to determine the position/posture at the specific time in a time period including a predicted time of a collision between the worker and the robot, based on the worker position and the motion planning.

16. A danger presentation system comprising the danger presentation device according to claim 1.

17. The danger presentation system according to claim 16, further comprising the robot which operates in accordance with the motion planning.

18. The danger presentation system according to claim 16, further comprising a display device configured to present the image data generated by said image generation unit as an image.

19. The danger presentation system according to claim 16, further comprising a warning sound output device configured to output a warning sound.

20. A method of presenting danger comprising:
  acquiring a worker position which is a position of a worker;
  determining a view range of the worker depending on the worker position acquired in said acquiring;
  identifying a specific time in which at least a part of a robot which operates according to a motion planning is included in the view range, and determining a position/posture which contains at least one of a position of the robot at the specific time and a posture of the robot at the specific time; and
  generating image data for illustrating the position/posture determined in said determining of the position/posture.

21. A non-transitory computer-readable recording medium on which a program is recorded, the program causing a computer to execute:
  acquiring a worker position which is a position of a worker;
  determining a view range of the worker depending on the worker position acquired in said acquiring;
  identifying a specific time in which at least a part of a robot which operates according to a motion planning is included in the view range, and determining a position/posture which contains at least one of a position of the robot at the specific time and a posture of the robot at the specific time; and
  generating image data for illustrating the position/posture determined in said determining of the position/posture.

* * * * *